United States Patent
Hayashi

(10) Patent No.: US 10,306,587 B2
(45) Date of Patent: May 28, 2019

(54) COMMUNICATION SYSTEM, BASE STATION, HOST NODE, AND COMMUNICATION METHOD

(71) Applicant: NEC Corporation, Tokyo (JP)

(72) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/835,134

(22) Filed: Dec. 7, 2017

(65) Prior Publication Data

US 2018/0103449 A1    Apr. 12, 2018

Related U.S. Application Data

(63) Continuation of application No. 15/233,377, filed on Aug. 10, 2016, now Pat. No. 9,872,273, which is a (Continued)

(30) Foreign Application Priority Data

Aug. 21, 2012 (JP) ................. 2012-182235

(51) Int. Cl.
*H04W 68/02* (2009.01)
*H04W 68/00* (2009.01)
*H04W 92/20* (2009.01)

(52) U.S. Cl.
CPC ......... *H04W 68/005* (2013.01); *H04W 68/02* (2013.01); *H04W 92/20* (2013.01)

(58) Field of Classification Search
CPC ... H04W 68/005; H04W 68/02; H04W 68/00; H04W 68/025

(Continued)

(56) References Cited

U.S. PATENT DOCUMENTS 8,934,902 B2 * 1/2015 Chen ............... H04W 36/30
                                                       455/436
9,451,585 B2    9/2016 Hayashi
(Continued)

FOREIGN PATENT DOCUMENTS

CN        101001445 A    7/2007
CN        101883431 A    11/2010
(Continued)

OTHER PUBLICATIONS

Chinese Office Action issued by the State Intellectual Property Office of the People's Republic of China for Chinese Application No. 201380054 750.0 dated Oct. 23, 2017 (12 pages).
(Continued)

*Primary Examiner* — Siu M Lee
(74) *Attorney, Agent, or Firm* — Wilmer Cutler Pickering Hale and Dorr LLP

(57) ABSTRACT

An object of the present invention is to provide a communication system, a base station, a host node, and a communication method in order to address one or more of the above-described problems. A communication system according to the present invention is a communication system including: a base station (10) and a host node (40) that communicates with the base station (10). The base station (10) included in the communication system transmits to the host node (40) setting information indicating whether or not a paging message transmitted from the host node (40) can be transmitted to other base stations, and the host node (40) receives the setting information from the base station (10).

12 Claims, 30 Drawing Sheets

Related U.S. Application Data continuation of application No. 14/421,595, filed as application No. PCT/JP2013/002853 on Apr. 26, 2013, now Pat. No. 9,451,585.

(58) Field of Classification Search
USPC .................. 455/458, 422.1, 426.1, 507, 515
See application file for complete search history.

(56) References Cited

U.S. PATENT DOCUMENTS

| | | | |
|---|---|---|---|
| 9,872,273 B2* | 1/2018 | Hayashi | .............. H04W 68/005 |
| 2010/0128621 A1 | 5/2010 | Hamabe et al. | |
| 2010/0210288 A1 | 8/2010 | Kim et al. | |
| 2011/0058542 A1* | 3/2011 | Nylander | .............. H04W 68/00 370/338 |
| 2011/0143783 A1* | 6/2011 | Lee | .............. H04W 68/02 455/458 |
| 2012/0129567 A1 | 5/2012 | Kimura et al. | |
| 2012/0231801 A1 | 9/2012 | Nakatsugawa | |
| 2013/0059611 A1 | 3/2013 | Takechi | |

FOREIGN PATENT DOCUMENTS

| | | |
|---|---|---|
| CN | 102378228 A | 3/2012 |
| EP | 2549808 | 1/2013 |
| JP | 2007-151045 A | 6/2007 |
| WO | WO-2011/080833 | 7/2011 |
| WO | WO-2011/114464 | 9/2011 |

OTHER PUBLICATIONS

CMCC, "Access Control Transfer from MME to eNB," 3GPP TSG-RAN WG3 Meeting #65bis, R3-092199, Agenda Item 14.1.1, Miyazaki, Japan, Oct. 12-15, 2009 (3 pages).

CMCC, "Solutions for paging optimization," 3GPP TSG-RAN WG3 Meeting #65-bis, R3-092204, Agenda Item 21, Miyazaki, Japan, Oct. 12-15, 2009 (3 pages).

English Translation of the International Search Report for International Patent Application No. PCT/JP2013/002853 dated Jul. 16, 2013 (1 page).

Extended European Search Report issued by the European Patent Office for Application No. 13830612.1 dated Mar. 11, 2016 (7 pages).

Japanese Office Action with English translation corresponding to Japanese Application No. 2014-531481, dated Sep. 29, 2015, 7 (pages).

Mitsubishi Electric, "Transferring a Paging Request Message," 3GPP TSG RAN WG3 Meeting #51, R3-060151, Feb. 13-17, 2006 (2 pages).

* cited by examiner

S1 SETUP REQUEST
This message is sent by the eNB to transfer information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(1..150,...) | | YES | ignore |
| Supported TAs | | 1..<maxnoofTACs> | | Supported TAs in the eNB | GLOBAL | reject |
| >TAC | M | | 9.2.3.7 | Broadcasted TAC | - | |
| >Broadcast PLMNs | | 1..<maxnoofBPLMNs> | | Broadcasted PLMNs | - | |
| >>PLMN Identity | M | | 9.2.3.8 | | | |
| Default paging DRX | M | | 9.2.1.16 | | YES | ignore |
| CSG Id List | | 0..1 | | | GLOBAL | reject |
| >CSG Id | M | 1 to <maxnoofCSGIds> | 9.2.1.62 | | | |
| Paging Optimization Support Indicator | O | | ENUMERATED(true, ...) | | YES | ignore |

Fig. 11

ENB CONFIGURATION UPDATE
This message is sent by the eNB to transfer updated information for
a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB Name | O | | Printable String(1..150,...) | | YES | ignore |
| Supported TAs | | 0..<maxnoofTACs> | | Supported TAs in the eNB | GLOBAL | reject |
| >TAC | M | | 9.2.3.7 | Broadcasted TAC | - | |
| >Broadcast PLMNs | | 1..<maxnoofBPLMNs> | | Broadcasted PLMNs | - | |
| >>PLMN Identity | M | | 9.2.3.8 | | - | |
| CSG Id List | | 0..1 | | | GLOBAL | reject |
| >CSG Id | | 1 to <maxnoofCSGId> | 9.2.1.62 | | - | |
| Default paging DRX | O | | 9.2.1.16 | | YES | ignore |
| Paging Optimization Support Indicator | O | | ENUMERATED(true, ...) | | YES | ignore |

Fig. 12

PAGING
This message is sent by the MME and is used to page a UE in one or several tracking areas.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to <maxnoofTAIs> | | | EACH | ignore |
| >>TAI | M | | 9.2.3.16 | | - | |
| CSG Id List | | 0..1 | | | GLOBAL | ignore |
| >CSG Id | | 1 to <maxnoofCSGId> | 9.2.1.62 | | - | |
| Paging Priority | O | | 9.2.1.78 | | YES | ignore |
| <u>Paging Optimization indicator</u> | <u>O</u> | | <u>ENUMERATED(yes, no, ...)</u> | | <u>YES</u> | <u>ignore</u> |

Fig. 15

S1 SETUP REQUEST
This message is sent by the eNB to transfer information for a TNL association.
Direction: eNB → MME

Fig. 17

| IE/Group Name | Presence | Range | IE type and reference | Semantics description | Criticality |
|---|---|---|---|---|---|
| Message Type | M | | 9.2.1.1 | | YES |
| Global eNB ID | M | | 9.2.1.37 | | YES |
| eNB Name | O | | PrintableString(1..150,...) | | YES |
| Supported TAs | | 1..<maxnoofTACs> | | Supported TAs in the eNB | GLOBAL |
| >TAC | M | | 9.2.3.7 | Broadcasted TAC | - |
| >Broadcast PLMNs | | 1..<maxnoofBPLMNs> | | Broadcasted PLMNs | - |
| >>PLMN Identity | M | | 9.2.3.8 | | |
| Default paging DRX | M | | 9.2.1.16 | | YES |
| CSG Id List | | 0..1 | | | GLOBAL |
| >CSG Id | M | 1 to <maxnoofCSGIds> | 9.2.1.62 | | |
| Neighbour Information | | 0..<maxnoofNeighbours> | | | = |
| >Global eNB ID | M | | 9.2.1.37 | eNB ID of the neighbour eNB | = |
| >>Supported TAs | | 1..<maxnoofTACs> | | Supported TAs in the eNB | GLOBAL |
| >>>TAC | M | | 9.2.3.7 | Broadcasted TAC | = |
| >>>Broadcast PLMNs | | 1..<maxnoofBPLMNs> | | Broadcasted PLMNs | = |
| >>>>PLMN Identity | M | | 9.2.3.8 | | |

ENB CONFIGURATION UPDATE
This message is sent by the eNB to transfer updated information
for a TNL association.
Direction: eNB → MME

| IE/Group Name | Presence | Range | IE type and reference | Semantics description | Criticality |
|---|---|---|---|---|---|
| Message Type | M | | 9.2.1.1 | | YES |
| eNB Name | O | | PrintableString(1..150,...) | | YES |
| Supported TAs | | 0..<maxnoofTACs> | | Supported TAs in the eNB | GLOBAL |
| >TAC | M | | 9.2.3.7 | Broadcasted TAC | - |
| >Broadcast PLMNs | | 1..<maxnoofBPLMNs> | | BroadcastedPLMNs | - |
| >>PLMN Identity | M | | 9.2.3.8 | | - |
| CSG Id List | | 0..1 | | | GLOBAL |
| >CSG Id | | 1 to <maxnoofCSGId> | 9.2.1.62 | | - |
| Default paging DRX | O | | 9.2.1.16 | | YES |
| <u>Neighbour Information</u> | | <u>0..<maxnoofNeighbours></u> | | | -- |
| <u>>Global eNB ID</u> | <u>M</u> | | <u>9.2.1.37</u> | <u>eNB ID of the neighbour eNB</u> | -- |
| <u>>>Supported TAs</u> | | <u>1..<maxnoofTACs></u> | | <u>Supported TAs in the eNB</u> | <u>GLOBAL</u> |
| <u>>>>TAC</u> | <u>M</u> | | <u>9.2.3.7</u> | <u>Broadcasted TAC</u> | - |
| <u>>>>Broadcast PLMNs</u> | | <u>1..<maxnoofBPLMNs></u> | | <u>Broadcasted PLMNs</u> | - |
| <u>>>>>PLMN Identity</u> | <u>M</u> | | <u>9.2.3.8</u> | | |

Fig. 18

PAGING
This message is sent by the eNB to a neighbouring eNB to transfer Paging and is used to page a UE in one or several tracking areas.
Direction: eNB → eNB

| IE/Group Name | Presence | Range | IE type and reference | Semantics description | Criticality | Assigned Criticality |
|---|---|---|---|---|---|---|
| Message Type | M | | | | YES | ignore |
| UE Identity Index value | M | | | | YES | ignore |
| UE Paging Identity | M | | | | YES | ignore |
| Paging DRX | O | | | | YES | ignore |
| CN Domain | M | | | | YES | ignore |
| List of eNBs | | 0 .. <maxnoofeNBs> | | | – | – |
| >Global eNB ID | M | | | | – | – |
| List of TAIs | | 1 | | | YES | ignore |
| >TAI List Item | | 1 to <maxnoofTAIs> | | | EACH | ignore |
| >>TAI | M | | | | - | |
| CSG Id List | | 0..1 | | | GLOBAL | ignore |
| >CSG Id | | 1 to <maxnoofCSGId> | | | - | |
| Paging Priority | O | | | | YES | ignore |

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |

Fig. 20

COMMUNICATION SYSTEM, BASE STATION, HOST NODE, AND COMMUNICATION METHOD

CROSS-REFERENCE TO RELATED APPLICATIONS

This application is a continuation of application U.S. patent application Ser. No. 15/233,377, entitled "COMMUNICATION SYSTEM, BASE STATION, HOST NODE, AND COMMUNICATION METHOD", filed Aug. 10, 2016, which is a continuation application of U.S. patent application Ser. No. 14/421,595, entitled "COMMUNICATION SYSTEM, BASE STATION, HOST NODE, AND COMMUNICATION METHOD", filed on Feb. 13, 2015, which is a national stage application of International Application No. PCT/JP2013/002853, entitled "COMMUNICATION SYSTEM, BASE STATION, HOST NODE, AND COMMUNICATION METHOD", filed on Apr. 26, 2013, which claims the benefit of the priority of Japanese Patent Application No. 2012-182235, filed on Aug. 21, 2012, the disclosures of each of which are hereby incorporated by reference in their entirety.

TECHNICAL FIELD

The present invention relates to call processing (paging processing) for a host node to call a mobile terminal.

BACKGROUND ART

As shown in FIG. 28, in an architecture of LTE (Long Term Evolution), eNBs 601 to 604, which are RAN nodes, are connected to an MME (Mobility Management Entity) 610 and an S-GW (Serving Gateway) 620, which are nodes belonging to a core network. When incoming data is transmitted to UE (User Equipment) in an idle state, for example, a sequence as shown in FIG. 29 is conducted. Specifically, when the MME 610 receives a Downlink Data Notification from the S-GW 620, it transmits a paging message to the eNBs 601 to 604. At this time, the MME 610 transmits Paging to the eNB located in an area where the UE has newly registered its location.

Here, the area where the UE has registered its location is represented by a TA (Tracking Area). The TA is an identifier (ID) indicating a logical location, and an operator can freely decide a size of an area covered by the TA according to a region and a traffic condition. Generally, if an area covered by one TA is large, the number of eNBs under control of the TA also tends to increase. In addition, even though the UE at idle time moves between the eNBs belonging to the same TA, location registration is unnecessary. That is, the number of signals concerning location registration generated in the UE moving between the eNBs can be suppressed by increasing the area covered by the TA.

To summarize, when an incoming call to the UE is generated, the MME transmits the paging message to an area covered by a newest TA where the UE is located.

Although FIG. 29 shows four eNBs as an example for simplicity of explanation, generally, for example, from hundreds of to one thousand eNBs may be present in the area covered by the TA. In such a case, the MME transmits the paging message to all the eNBs. Namely, the MME must transmit the paging message to from hundreds of to one thousand eNBs within an extremely short time. As a result, a load on processing of the paging message of the MME rapidly increases.

Non Patent Literature 1 discloses a proposal on paging optimization in which when one or more certain appropriate eNBs receive a paging message from an MME, and the eNBs that have received the paging message transmit the paging message to neighbouring eNBs instead of the MME in order to reduce a processing load in the MME. The proposal according to Non Patent Literature 1 has been discussed in 3GPP (3rd Generation Partnership Project). This example is shown in FIG. 30.

FIG. 30 shows that when the eNB 601 receives the paging message from the MME, it transmits the paging message to the neighbouring eNBs 602 to 604 instead of the MME 610.

CITATION LIST

Non Patent Literature

Non Patent Literature 1: 3GPP TSG RAN WIGS Meeting#51 R3-060151 "Transferring a paging request message" February 2006

SUMMARY OF INVENTION

Technical Problem

However, specifications concerning paging optimization have not been examined in detail yet. The inventor of the present invention has found that at least the following problems occur in relation to the above-described paging optimization.

First, a problem occurs when the MME transmits the paging message to all the eNBs under the control of the TA as usual. In this case, a predetermined eNB transmits the paging message transmitted from the MME to neighbouring eNBs instead of the MME. As a result, one eNB receives a plurality of the same paging messages (the paging message from the MME and the paging message from the eNB), and the eNB transmits two paging messages to a radio line. As a result, a precious radio resource is wastefully used (refer to FIG. 31). That is, there is a problem that efficiency of utilization of the radio resource decreases.

Furthermore, it is considered that a problem occurs also when the eNB does not send the paging message to the neighbouring eNBs instead of the MME. For example, the MME transmits the paging message only to the predetermined eNB. Next, if the eNB does not transmit the paging message from the MME to the neighbour eNBs, UE under control of the neighbouring eNBs cannot receive the paging message (refer to FIG. 32). That is, there are eNBs that fail to receive the paging message. As mentioned above, a fundamental cause of these problems is that the MME cannot know whether or not the eNB can send the paging message to the neighbouring eNBs instead of the MME.

An object of the present invention is to provide a communication system, a base station, a host node, and a communication method in order to address one or more of the above-described problems.

Solution to Problem

A communication system according to a first exemplary aspect of the present invention is a communication system including: a base station and a host node that communicates with the base station, wherein the base station transmits to the host node setting information indicating whether or not a paging message transmitted from the host node can be transmitted to other base stations, and the host node receives the setting information from the base station.

A base station according to a second exemplary aspect of the present invention is a base station that communicates with a host node, including: a communication unit that transmits to the host node setting information indicating whether or not a paging message transmitted from the host node can be transmitted to other base stations.

A host node according to a third exemplary aspect of the present invention is a host node that communicates with a base station, including: a communication unit that receives from the base station setting information indicating whether or not a paging message transmitted from the host node to the base station can be transmitted to other base stations.

A communication method according to a fourth exemplary aspect of the present invention is a communication method including: generating setting information indicating whether or not a paging message transmitted from a host node can be transmitted to other base stations, and transmitting to the host node the setting information.

Advantageous Effects of Invention

According to the present invention, a communication system, a base station, a host node, and a communication method that do not decrease efficiency of utilization of a radio resource are provided.

BRIEF DESCRIPTION OF DRAWINGS

FIG. 11 is a configuration diagram of an S1 Setup Request according to the embodiment 3.

FIG. 12 is a configuration diagram of an ENB CONFIGURATION UPDATE according to the embodiment 3.

FIG. 15 is a configuration diagram of the paging message according to the embodiment 4.

FIG. 17 is a configuration diagram of the S1 Setup Request according to the embodiment 5.

FIG. 18 is a configuration diagram of an ENB CONFIGURATION UPDATE according to the embodiment 5.

FIG. 20 is a configuration diagram of the paging message according to the embodiment 6.

DESCRIPTION OF EMBODIMENTS

Embodiment 1

Figure 1:
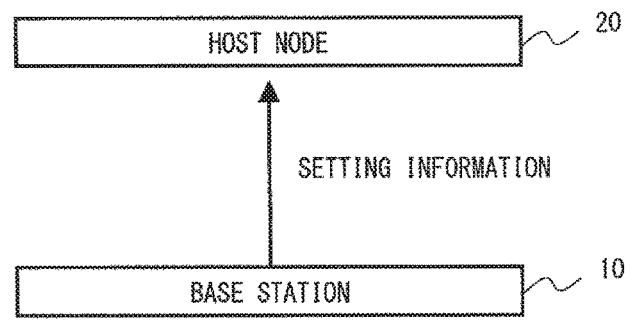
FIG. 1 is a configuration diagram of a communication system according to an embodiment 1.

Hereinafter, embodiments of the present invention will be explained with reference to drawings. A configuration example of a communication system according to an embodiment 1 of the present invention will be explained using FIG. 1. The communication system of FIG. 1 has a base station 10 and a host node 20. The host node 20 communicates with the base station 10. The host node 20 is, for example, an apparatus that aggregates a plurality of base stations, and may relay communications between the base station and a device belonging to a core network.

When the host node 20 receives data addressed to a mobile station present under control of the base station 10, the host node 20 transmits a paging message to the mobile station through the base station 10 in order to call the mobile station. Usually, the host node 20 transmits the paging message to a plurality of base stations present in a predetermined area (for example, a TA) in order to call a target mobile station. As methods to transmit a paging message to a plurality of base stations, there are a method in which a host node transmits the paging message to the plurality of base stations, and a method in which the base station that has received the paging message from the host node transmits the paging message to other neighbour base stations.

The base station 10 transmits to the host node 20 setting information indicating whether or not the paging message transmitted from the host node 20 can be transmitted to other base stations. Furthermore, the host node 20 receives the setting information transmitted from the base station 10. Although the plurality of base stations are present in the communication system, not all the base stations can transmit the paging message transmitted from the host node 20 to the other base stations. Therefore, the base station transmits the setting information to the host node 20 as mentioned above, and the host node 20 determines based on the setting information whether or not the base station, which is a destination of the paging message, can transmit the paging message to the other base stations.

Figure 2:
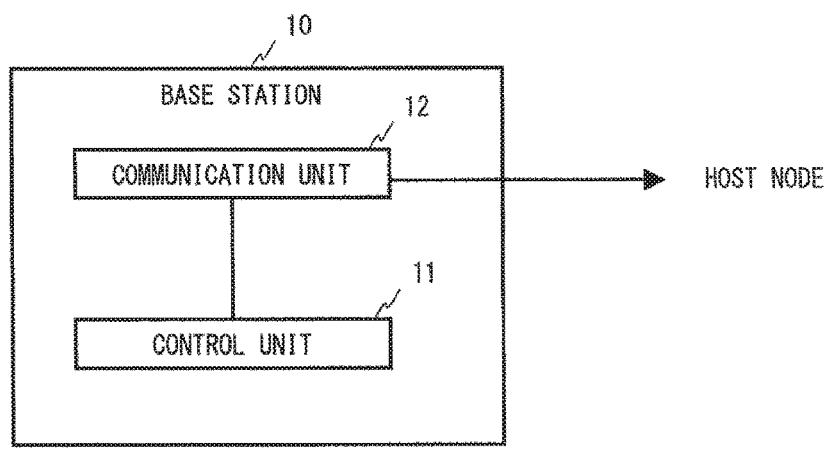
FIG. 2 is a configuration diagram of a base station according to the embodiment 1.

Subsequently, a configuration example of the base station 10 according to the embodiment 1 of the present invention will be explained using FIG. 2. The base station 10 has a control unit 11 and a communication unit 12. The control unit 11 outputs to the communication unit 12 an instruction message that instructs the communication unit 12 to transmit setting information to the host node 20. The setting information is the information indicating whether or not the paging message transmitted from the host node 20 can be transmitted to the other base stations. Alternatively, the control unit 11 may generate setting information and output the generated setting information to the communication unit 12.

When the communication unit 12 receives the instruction message from the control unit 11, it transmits the setting information to the host node 20. In this case, the setting information may be previously held in the communication unit 12, or may be output to the communication unit 12 from a storage unit (not shown) etc. that stores the setting information. Alternatively, when the communication unit 12 receives the setting information from the control unit 11, it may transmit the received setting information to the host node 20.

Figure 3:
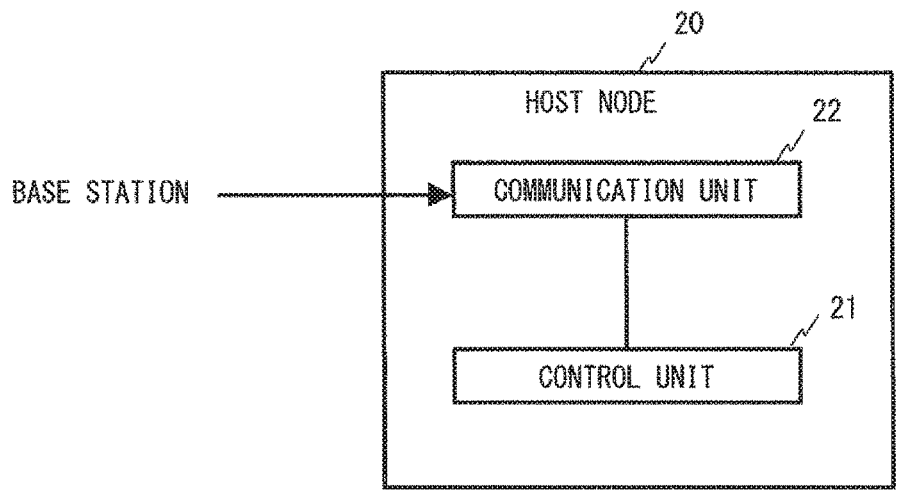
FIG. 3 is a configuration diagram of a host node according to the embodiment 1.

Next, a configuration example of the host node 20 according to the embodiment 1 of the present invention will be explained using FIG. 3. The host node 20 has a control unit 21 and a communication unit 22. The communication unit 22 receives setting information transmitted from the base station 10. The control unit 21 stores in a memory etc. the setting information of the base station 10, which is a transmission source of the setting information. When setting information is received from the plurality of base stations in the communication unit 22, the setting information of the plurality of base stations is stored in the memory etc.

As explained above, the base station 10 according to the embodiment 1 of the present invention can notify the host node 20 of its own information on the setting information indicating whether or not the paging message transmitted from the host node 20 can be transmitted to the other base stations. Furthermore, the host node 20 can know whether or not the base station 10 can transmit the paging message to the other base stations based on the setting information transmitted from the base station 10.

Embodiment 2

Subsequently, a configuration example of a communication system according to an embodiment 2 of the present invention will be explained using FIG. 4.

Figure 4:
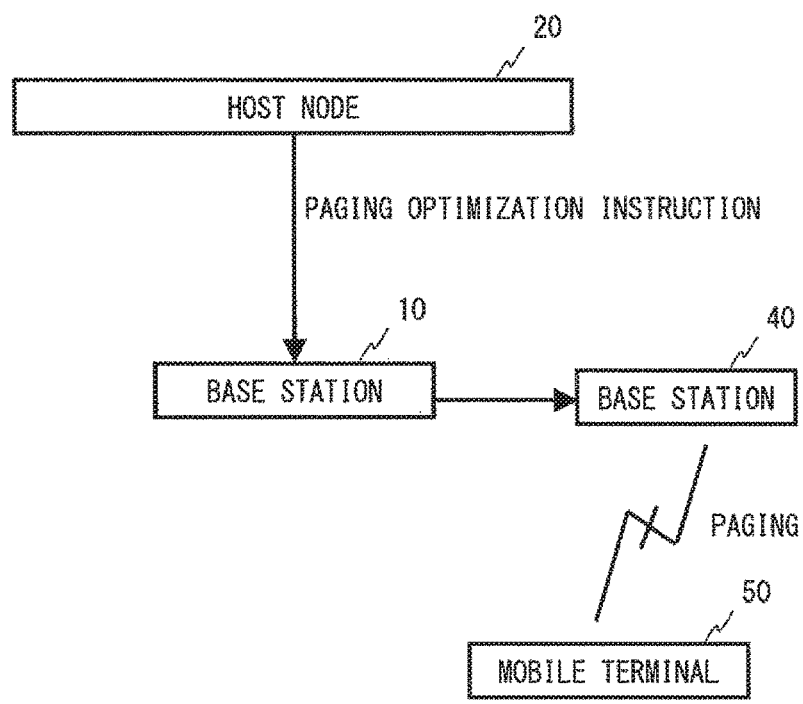
FIG. 4 is a configuration diagram of a communication system according to an embodiment 2.

The communication system of FIG. 4 has the base station 10, a base station 40, the host node 20, and a mobile terminal 50. In addition, the base station 10 and the base station 40 are configured so as to be able to communicate with each other. The mobile terminal 50 is located in a cell area formed by the base station 10 or the base station 40. Furthermore, the host node 20 receives data addressed to the mobile terminal 50, and transmits a paging message to the base station 10 together with a paging optimization instruction in order to call the mobile terminal 50. The paging optimization instruction is the instruction to transmit to other base stations the paging message that has been transmitted from the host node 20 to the base station 10.

Figure 5:
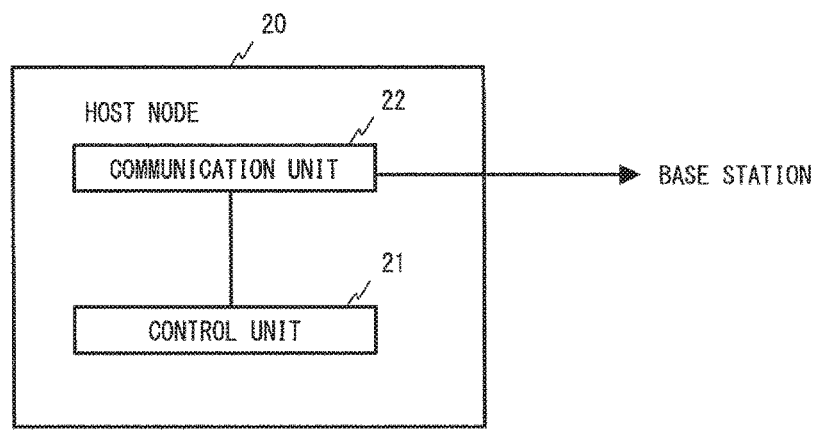
FIG. 5 is a configuration diagram of a host node according to the embodiment 2.

The host node 20 of FIG. 5 indicates transmitting of the paging optimization instruction to the base station 10. The control unit 21 instructs the communication unit 22 to transmit the paging optimization instruction. The communication unit 22 transmits the paging optimization instruction to the base station 10 based on the instruction from the control unit 21.

Figure 6:
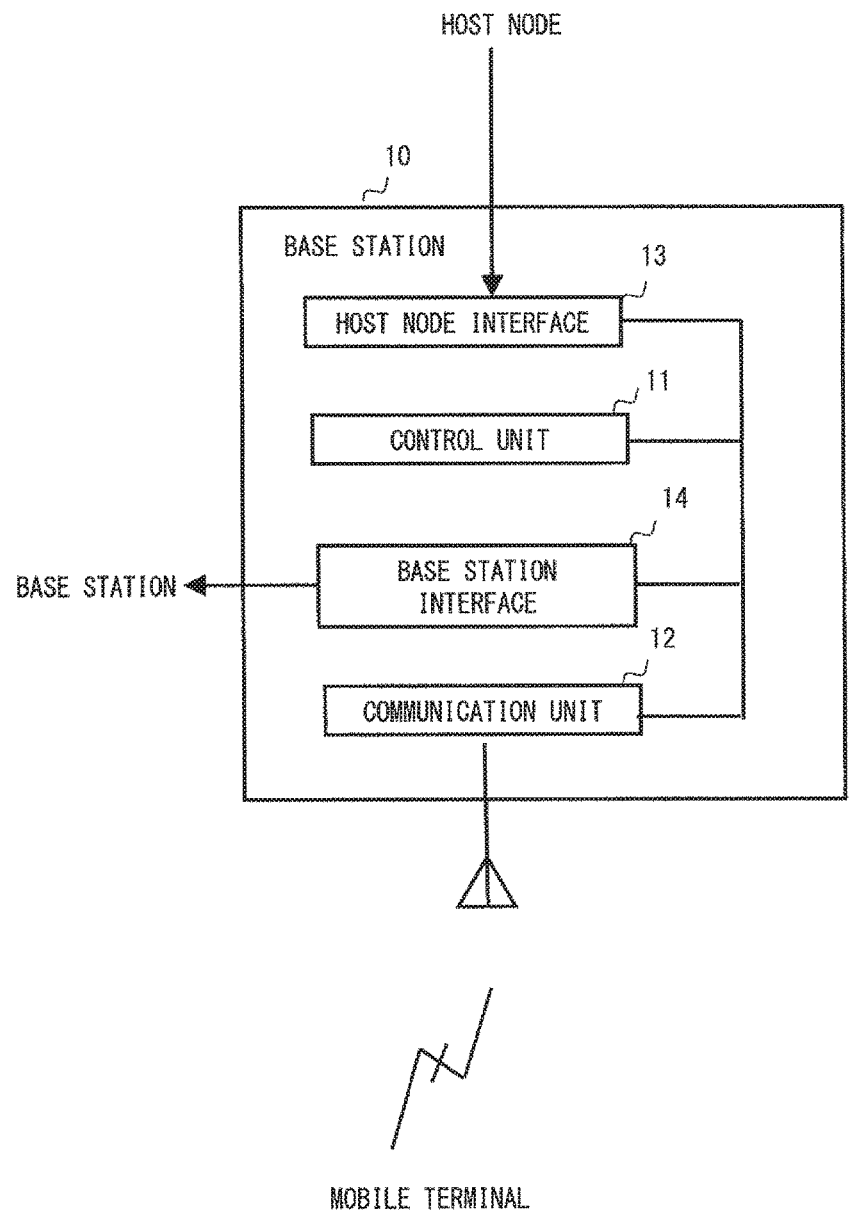
FIG. 6 is a configuration diagram of a base station according to the embodiment 2.

Subsequently, a configuration example of the base station 10 according to the embodiment 2 of the present invention will be explained using FIG. 6. Since the base station 40 has a configuration similar to that of the base station 10, a detailed explanation thereof is omitted. The base station 10 has the control unit 11, the communication unit 12, a host node interface 13, and a base station interface 14. Since the control unit 11 and the communication unit 12 are similar to the control unit 11 and the communication unit 12 that have been explained in regard to the base station 10 of FIG. 2, symbols the same as those attached to the latter are attached to the former.

The host node interface 13 is the interface used for communication with the host node 20. The communication unit 12 receives the paging optimization instruction from the host node 20 through the host node interface 13.

The control unit 11 instructs the communication unit 12 to transmit the paging message transmitted from the host node 20 to another base station based on the paging optimization instruction that the communication unit 12 has received from the host node 20. The other base station, which is a transmission destination of the paging message, is, for example, the base station 40.

The base station interface 14 is the interface used for communication with the base station 40. The communication unit 12 transmits the paging message transmitted from the host node 20 to the base station 40 through the base station interface 14. In addition, the base station interface 14 may be used for communication with a plurality of base stations other than the base station 40. In this case, the communication unit 12 may transmit the paging message transmitted from the host node 20 to the plurality of base stations through the base station interface 14.

The communication unit 12 transmits the paging message to a mobile terminal located in the cell area formed by the base station 10. When the mobile terminal 50 is located in the cell area formed by the base station 10, a radio line is set between the communication unit 12 and the mobile terminal 50. Similarly, the paging message is transmitted to a mobile terminal located in the cell area formed by the base station 40 also in the base station 40. Therefore, when the mobile terminal 50 is located in the cell area formed by the base station 40, a radio line is set between a communication unit of the base station 40 and the mobile terminal 50.

Figure 7:
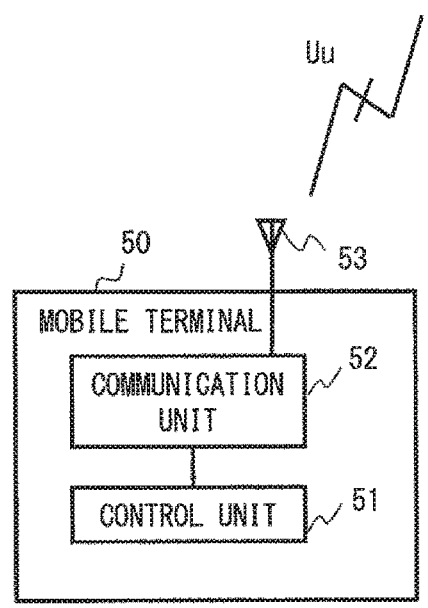
FIG. 7 is a configuration diagram of a mobile terminal according to the embodiment 2.

Next, a configuration example of the mobile terminal 50 according to the embodiment 2 of the present invention will be explained using FIG. 7. The mobile terminal 50 has a control unit 51 and a communication unit 52. The communication unit 52 has an antenna 53 in order to receive a radio signal transmitted from the base station 10 or the base station 40. The communication unit 52 receives a paging message from the base station 10 or the base station 40 through the antenna 53.

The control unit 51 determines whether or not the paging message received by the communication unit 52 is the paging message addressed to its own mobile terminal 50. If the control unit 51 determines that the paging message received by the communication unit 52 is the paging message addressed to its own mobile terminal 50, the control unit 51 instructs the communication unit 52 to transmit a response message to the paging message to the base station 10 or the base station 40. In addition, if the control unit 51 determines that the paging message received by the communication unit 52 is not the paging message addressed to its own mobile terminal 50, the control unit 51 does not instruct the communication unit 52 to transmit a response message.

When the communication unit 52 is instructed to transmit a response message to the paging message received from the control unit 51, the communication unit 52 transmits the response message to the base station 10 or the base station 40 through the antenna 53.

As explained above, the host node 20 according to the embodiment 2 of the present invention can transmit to the base station 10 the paging optimization instruction instructing the base station 10 to transmit the paging message to the other base stations. As a result, the host node 20 can explicitly inform the base station 10 whether or not the base station 10 should carry out paging optimization processing. In addition, the base station 10 can determine whether to transmit the paging message to the other base stations according to whether the base station 10 has received the paging optimization instruction from the host node 20.

The embodiment 2 of the present invention may be carried out in combination with the embodiment 1. That is, when the host node 20 receives from the base station 10 setting information indicating that the base station 10 can transmit the paging message to the other base station (for example, the base station 40), the host node 20 may transmit the paging optimization instruction to the base station 10. Furthermore, when the host node 20 receives from the base station 10 setting information indicating that the base station 10 cannot transmit the paging message to the other base station, the host node 20 may avoid transmitting the paging optimization instruction to the base station 10. In this case, since the base station 10 has not received the paging optimization instruction, it does not transmit the paging message to the other base station. Alternatively, when the host node 20 receives from the base station 10 the setting information indicating that the base station 10 cannot transmit the paging message to the other base station, the host node 20 may transmit to the base station 10 a message to instruct the base station 10 not to perform paging optimization.

The embodiments 1 and 2 are combined with each other to carry out the present invention as described above, and thereby the host node can transmit the paging optimization instruction to the base station that supports paging optimization. Therefore, the base station that has received the paging optimization instruction can be prevented from not transmitting the paging message to the other base stations, and thus the paging message reliably reaches all the base stations.

Embodiment 3

Figure 8:
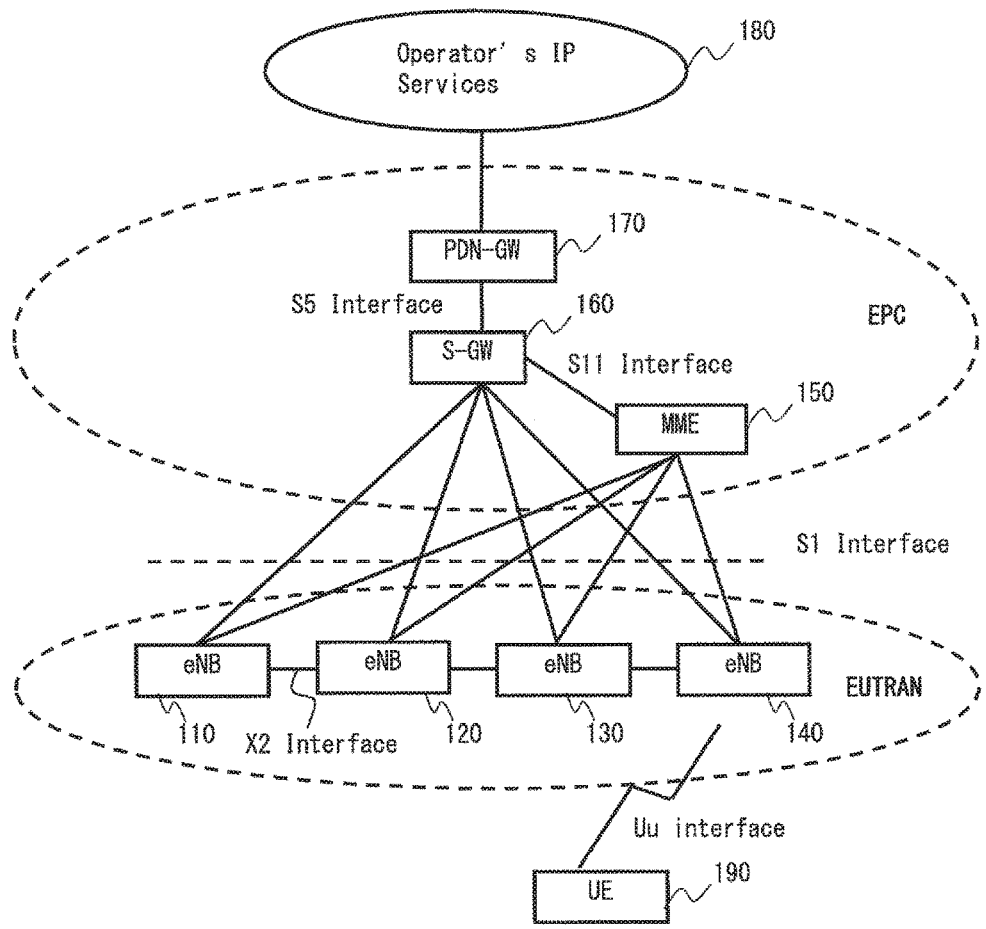
FIG. 8 is a configuration diagram of a communication system according to an embodiment 3.

Next, a configuration example when the communication system according to the embodiment 1 is applied to architecture of LTE (Long Term Evolution) will be explained using FIG. 8. The architecture in the LTE of FIG. 8 has eNBs (evolved Node Bs) 110 to 140, an MME 150, an S-GW 160, a PDN-GW 170, an IP Service 180, and UE 190. The MME 150, the S-GW 160, and the PDN-GW 170 configure an EPC (Evolved Packet Core), and the eNBs 110 to 140 (an eNB group) configure an EUTRAN. The IP Service 180 is a service platform that a communication common carrier (an operator) configures in order to provide services.

In the LTE architecture, interfaces between the NBs 110 to 140 and the MME 150 are specified as an S1 interface. Similarly, interfaces between the eNBs 110 to 140 and the S-GW 160 are also specified as the S1 interface. An interface between the S-GW 160 and the PDN-GW 170 is specified as an S5 interface, and an interface between the MME 150 and the S-GW 160 is specified as an S11 interface. Furthermore, an interface between the eNBs is specified as an X2 interface. An interface between the UE 190 and the eNBs is specified as a Uu interface.

Note that in the following explanation, a paging message that the eNB transmits to a neighbouring eNB instead of the MME is referred to as an X2 paging message, and a paging message transmitted from the MME to the eNB is referred to as an S1 paging message. Here, the neighbouring eNB is the eNB connected through the X2 interface.

Figure 9:
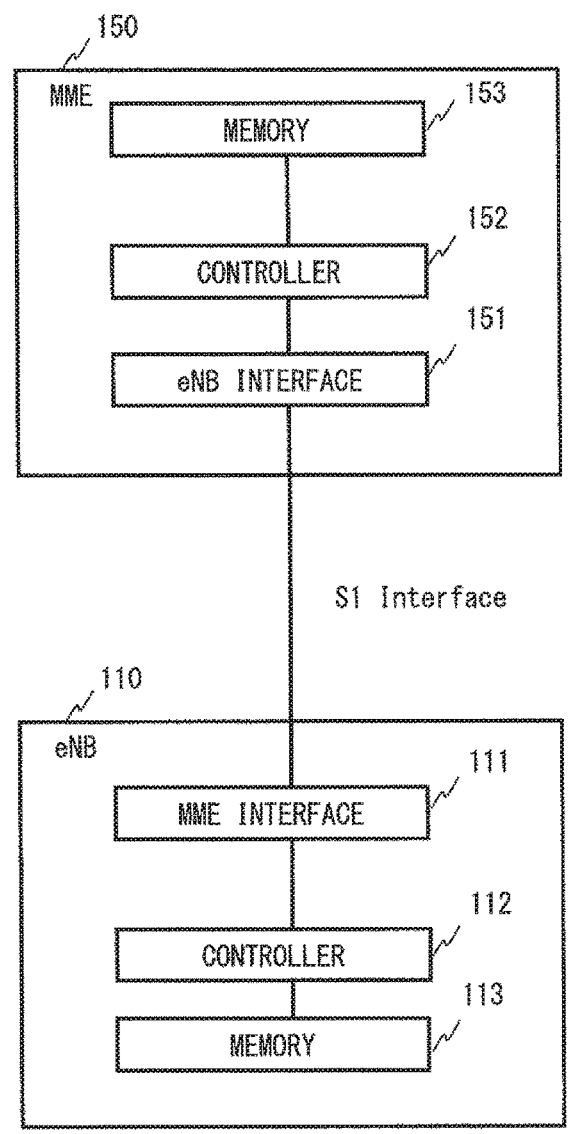
FIG. 9 is a configuration diagram of an eNB and an MME according to the embodiment 3.

Next, configuration examples of the eNB 110 and the MME 150 according to an embodiment 3 of the present invention will be explained using FIG. 9. Note that since the eNBs 110 to 140 have similar configurations, only the configuration example of the eNB 110 is explained in FIG. 9, while explanations of the eNBs 120 to 140 are omitted.

The eNB 110 has an MME interface 111, a controller 112, and a memory 113. The memory 113 stores setting information on capability indicating whether or not the eNB 110 carries out paging optimization in which the eNB 110 transmits the X2 paging message to the neighbouring eNBs instead of to the MME 150.

The MME interface 111 is the interface used to perform communication with the MME 150 (S1 interface). The controller 112 transmits to the MME 150 the setting information on the capability indicating whether or not the eNB 110 carries out Paging Optimization through the MME interface 111.

The MME 150 has an eNB interface 151, a controller 152, and a memory 153. The eNB interface 151 and the MME interface 111 are connected to each other through the S1 interface. The controller 152 receives setting information of the eNB 110 transmitted from the eNB 110 through the eNB interface 151. Furthermore, the controller 152 stores the setting information received from the eNB 110 in the memory 153. The MME 150, in addition to being connected to the eNB 110 through the S1 interface, is also connected to the eNBs 120 to 140. Therefore, the memory 153 also stores setting information of the eNBs 120 to 140.

Subsequently, a flow of processing that transmits the setting information from the eNBs 110 to 140 to the MME 150 will be explained using FIG. 10. When the eNBs 110 to 140 are started up (activated) (S1, S3, S5, S7), they each transmit an S1 Setup Request to the MME 150, respectively (S2, S4, S6, S8).

Configuration information (Configuration) of each eNB is included in the S1 Setup Request. For example, a TA (Tracking Area) to which each eNB belongs, an eNB-ID to uniquely identify the eNB in the communication system, etc. are included in the configuration information.

Furthermore, a Paging Optimization Support Indicator is included in the S1 Setup Request. The Paging Optimization Support indicator indicates capability of whether or not the eNB supports the Paging Optimization. For example, when the Paging Optimization Support Indicator is set to be True, it indicates that the eNB supports the Paging Optimization, and when the Paging Optimization Support Indicator is set to be False, it indicates that the eNB does not support the Paging Optimization. True and False may be replaced with Yes and No, etc.

Figure 10:
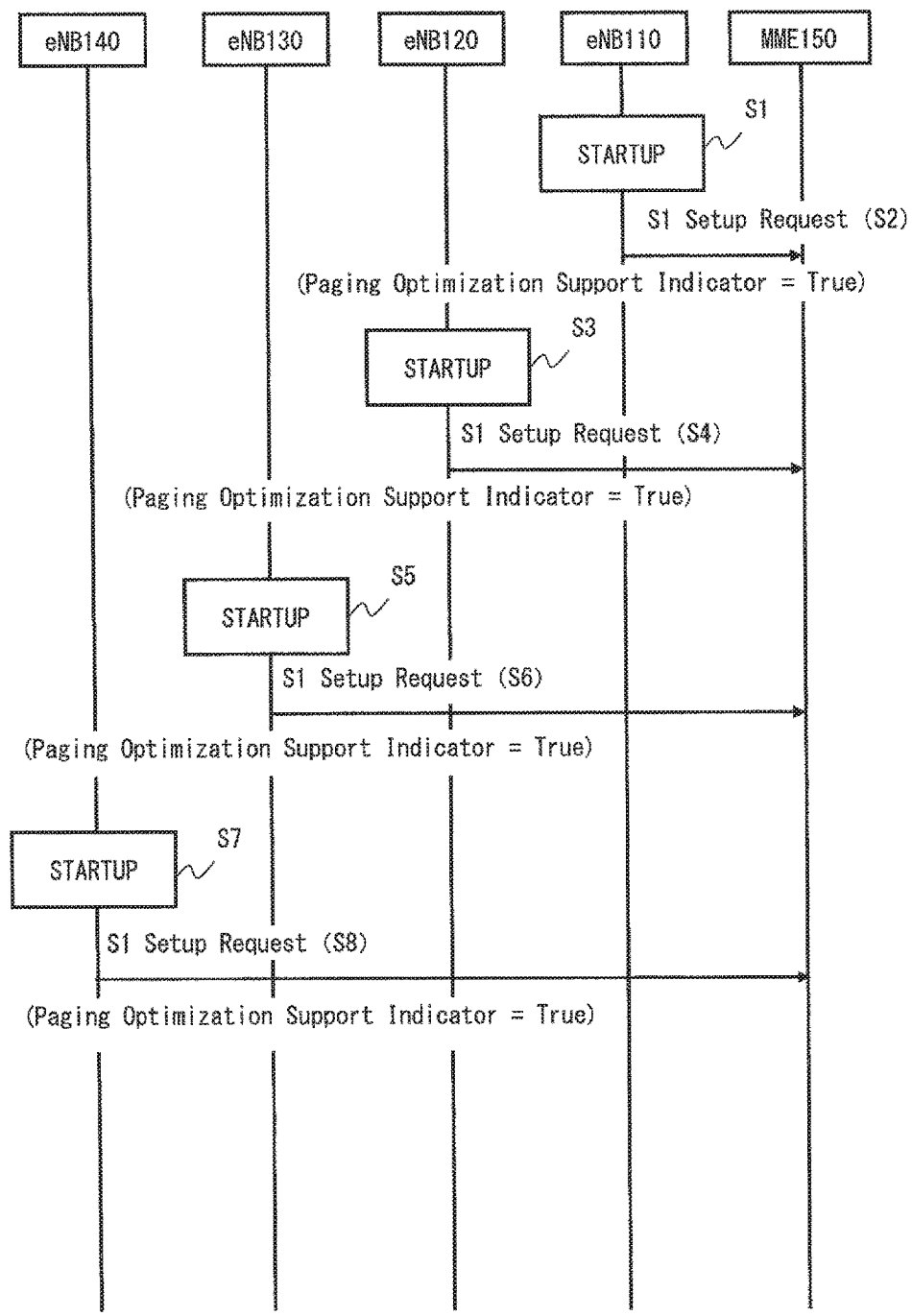
FIG. 10 is a chart showing a flow of transmission processing of setting information according to the embodiment 3.

FIG. 10 shows that the eNBs 110 to 140 notify the MME 150 about supporting the Paging Optimization. Here, a name of the Paging Optimization Support Indicator is one example of what the eNBs 110-140 notify the MME 150 about and, for example, it may be a name of an X2 Paging Support Indicator or may be a name suitable for such name.

Subsequently, a configuration example of the S1 Setup Request including the Paging Optimization Support Indicator will be explained using FIG. 11. When the eNB supports Paging Optimization, an information element of the Paging Optimization Support Indicator is set to the S1 Setup Request. When the eNB does not support the Paging Optimization, the information element of the Paging Optimization Support Indicator is not set to the S1 Setup Request. Alternatively, when the eNB supports the Paging Optimization, ENUMERATED (true) may be set to an IE type and reference of the Paging Optimization Support Indicator, and when the eNB does not support the Paging Optimization, ENUMERATED (false) may be set to the IE type and reference of the Paging Optimization Support Indicator.

Next, an example of notifying of the Paging Optimization Support Indicator using a message different from the S1 Setup Request will be explained using FIG. 12. Usually, a function etc. supported in the eNB may be changed by updating of a software in the middle of the eNB starting up and operating. For example, Paging Optimization may be supported in the eNB by performing a software update. In this case, the eNB may notify the MME 150 that the eNB will support the Paging Optimization using an ENB Configuration Update.

A configuration example of the ENB Configuration Update including the Paging Optimization Support Indicator is shown in FIG. 12. When the eNB supports the Paging Optimization by the updating of the software, the information element of the Paging Optimization Support Indicator is set to the ENB Configuration Update. Alternatively, when the eNB supports the Paging Optimization by the updating of the software, ENUMERATED (true) may be set to the IE type and reference of the Paging Optimization Support Indicator.

In addition, when the information element of the Paging Optimization Support Indicator is not set, or when ENUMERATED (false) is set to the IE type and reference of the Paging Optimization Support Indicator, the eNB does not support the Paging Optimization. A case where setting indicating that the eNB does not support the Paging Optimization is performed in the ENB Configuration Update is, for example, a case where, although the eNB supports the Paging Optimization in a state before the ENB Configuration Update is performed, the eNB does not support the Paging Optimization after the ENB Configuration Update is performed.

As explained above, notification of the setting information held by the eNB can be sent to the MME also in the LIE architecture by using the communication system according to the embodiment 3 of the present invention. Consequently, the MME can determine whether or not the Paging Optimization is supported in the eNB. Therefore, since notification of the paging message can be reliably sent to an eNB where a mobile terminal serving as a paging target may be located using the S1 paging message and the X2 paging message, failure to transmit the paging message to the mobile terminal in the eNB can be prevented.

Embodiment 4

Figure 13:
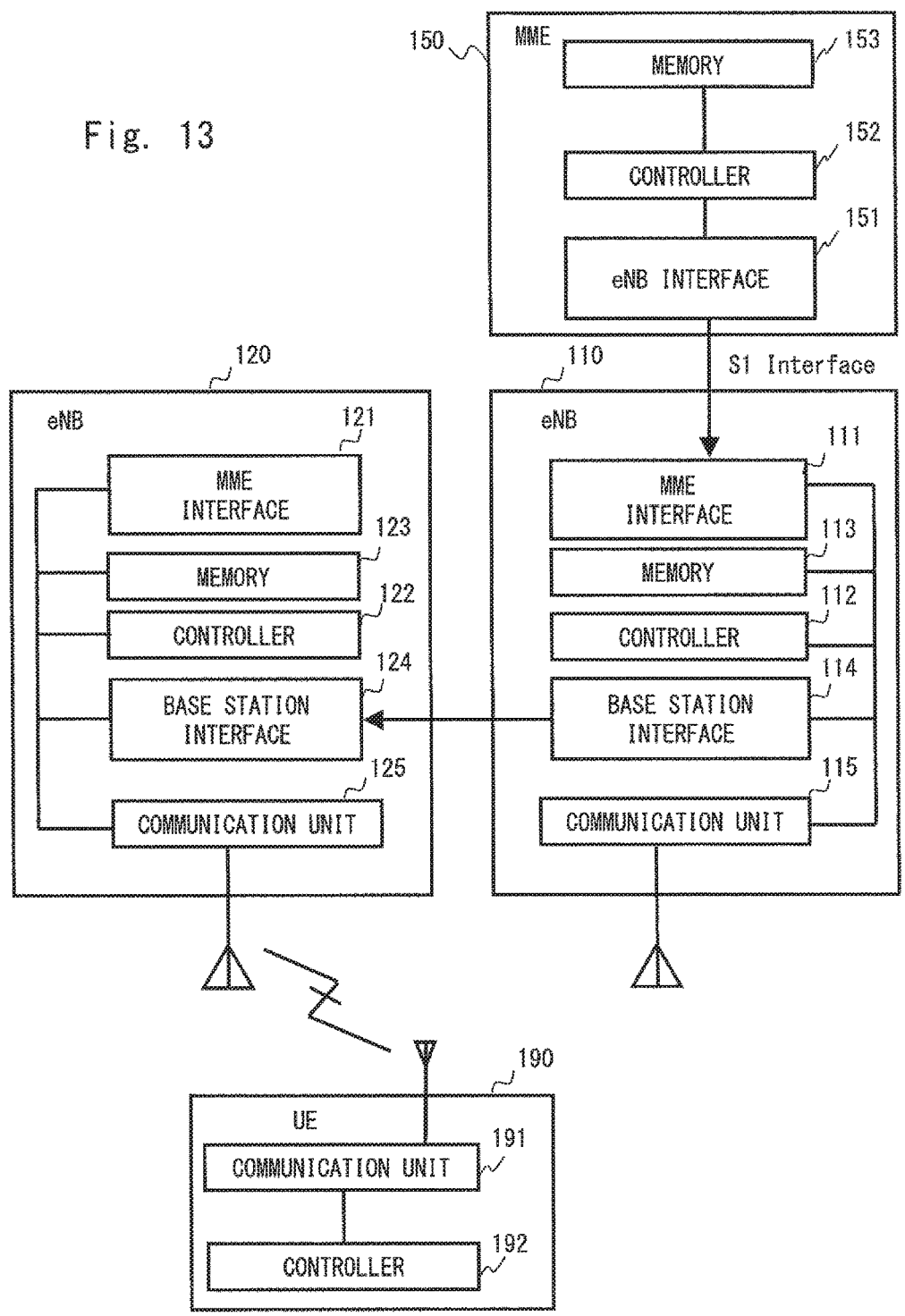
FIG. 13 is a configuration diagram of a communication system according to an embodiment 4.

Subsequently, a configuration example when the communication system according to the embodiment 2 is applied to the architecture of LTE (Long Term Evolution) will be explained using FIG. 13. The communication system according to an embodiment 4 has the eNB 110, the eNB 120, and the MME 150. Here, components similar to those of FIG. 9 are explained with the same symbols as those in FIG. 9 attached thereto.

The memory 153 stores information on a paging optimization instruction. The eNB interface 151 is the interface used for communication with the eNB connected through the S1 interface. The controller 152 transmits the paging optimization instruction stored in the memory 153 to a predetermined eNB through the eNB interface 151. The predetermined eNB is assumed to be the eNB 110 in FIG. 13. Furthermore, the memory 153 also transmits the S1 paging message to the eNB 110.

The eNB 110 has the MME interface 111, the controller 112, the memory 113, a base station interface 114, and a communication unit 115. The MME interface 111 is the interface used for communication with the MME 150 connected through the S1 interface. The communication unit 115 stores the paging optimization instruction received through the MME interface in the memory 113.

The base station interface 114 is the interface used for communication with the eNB 120. The communication unit 115 transmits the S1 paging message transmitted from the MME 150 to the eNB 120 through the base station interface 114. In addition, the base station interface 114 may be used for communication with a plurality of eNBs other than the eNB 120. In this case, the communication unit 115 may transmit the S1 paging message transmitted from the MME 150 to the plurality of eNBs through the base station interface 114.

When the communication unit 115 receives the paging optimization instruction together with the S1 paging message, it transmits the X2 paging message to the eNB 120. The communication unit 115 further transmits the paging message to a mobile terminal located in a cell area formed by the eNB 110. When the UE 190 is located in the cell area formed by the eNB 110, a radio line is set between the communication unit 115 and a communication unit 192 of the LIE 190. Similarly, a communication unit 125 transmits the paging message to a mobile terminal located in a cell area formed by the eNB 120 also in the eNB 120. Therefore, when the UE 190 is located in the cell area formed by the eNB 120, a radio line is set between the communication unit 125 of the eNB 120 and the UE 190.

An MME interface 121, a controller 122, a memory 123, a base station interface 124, and the communication unit 125 that configure the eNB 120 have functions similar to those of the components of the eNB 110. Therefore, detailed explanations thereof are omitted.

Next, a flow of paging processing upon the arrival of an incoming call according to the embodiment 4 of the present invention will be explained using FIG. 14. First, when Downlink data addressed to the UE 190 is generated in an idle state of the UE 190, the PDN-GW 170 connected to an external network receives the Downlink data, and transfers the Downlink data to the S-GW 160 (S11).

Next, when the S-GW 160 receives the Downlink data, it transmits to the MME 150 a Downlink Data Notification indicating the arrival of incoming data (S12). When the MME 150 receives the Downlink Data Notification, it transmits a Downlink Data Notification Ack to the S-GW 160 as a response signal (S13).

Here, referring to an A portion surrounded by a dotted line of FIG. 14, a flow of processing when the MME 150 recognizes that the eNB supports Paging Optimization in the S1 Setup Request received at the time of activation of the eNB 110 will be explained. The A portion surrounded by the dotted line of FIG. 14 shows a flow of processing when a paging optimization instruction is transmitted. The MME 150 sets "yes" to an information element of the Paging Optimization Indicator of the S1 paging message that is transmitted to the eNB 110 (S14). When the eNB 110 receives the S1 paging message in which "yes" has been set the information element of the Paging Optimization indicator, the eNB 110 transmits the X2 paging message to the neighbouring eNBs (for example, the eNBs 120 to 140) through the X2 interface in addition to transmitting the paging message to a mobile terminal located in its own cell area (S15).

Next, a flow of processing when the MME 150 recognizes that none of the eNBs 110 to 140 support Paging Optimization will be explained, referring to a B portion surrounded by a dotted line of FIG. 14. The B portion surrounded by the dotted line of FIG. 14 shows a flow of processing when the paging optimization instruction is not performed. The MME 150 sets "No" to the information element of the Paging Optimization Indicator of the S1 paging message that is transmitted to the eNBs 110 to 140 (S16). Here, when the eNBs 110-140 receive the S1 paging message in which "No" has been set to the information element of the Paging Optimization Indicator, the eNBs 110 to 140 transmit the paging message to mobile terminals located in their own cell areas. In addition, the eNBs 110 to 140 do not transmit the X2 paging message to the neighbouring eNBs. In addition, the eNB that does not support the Paging Optimization may not recognize the information element itself of the Paging Optimization Indicator of the paging message. In this case, the eNB ignores the information element of the Paging Optimization Indicator, and transmits the paging message to the mobile terminal located in its own cell area.

Figure 14:
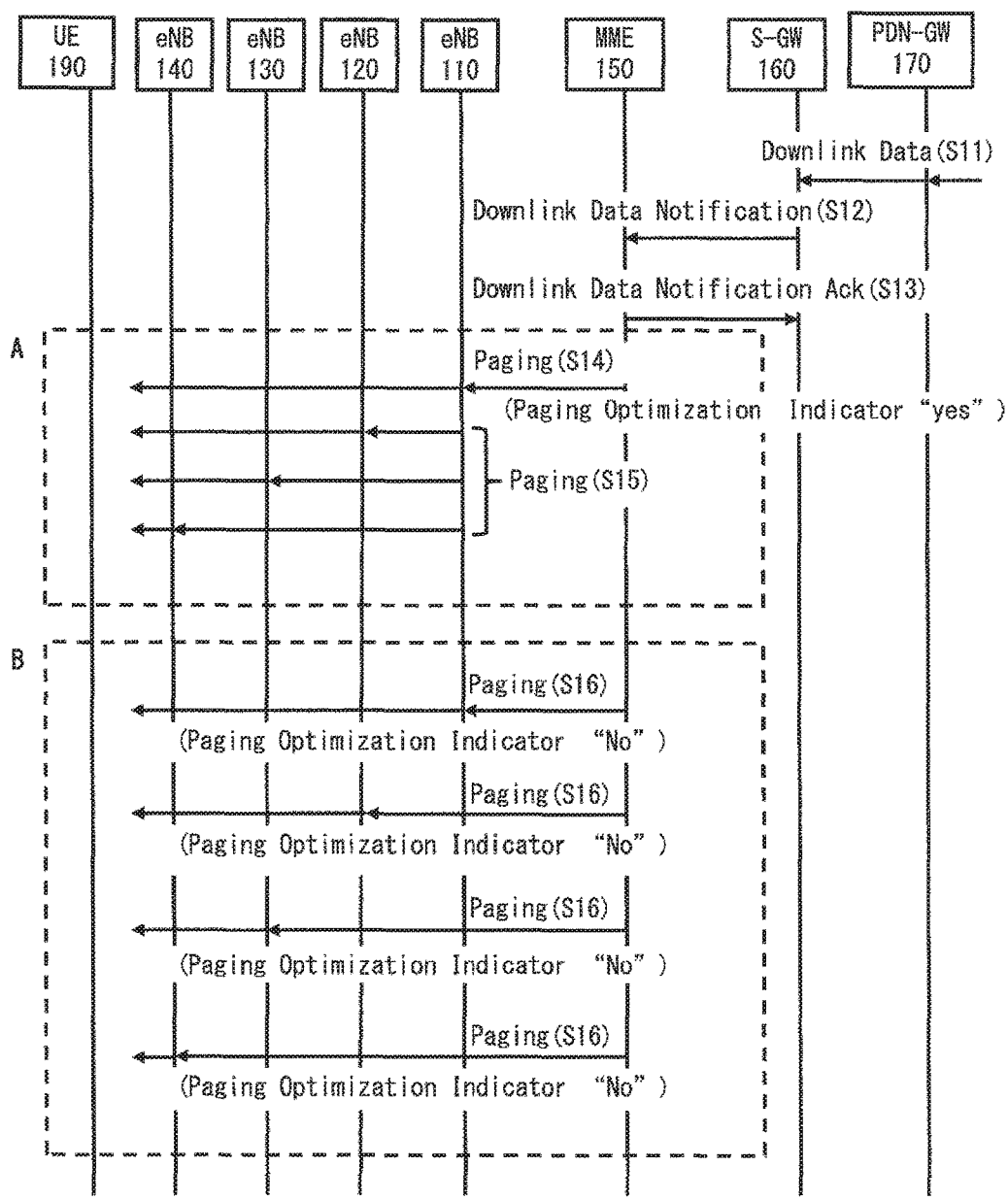
FIG. 14 is a chart showing a transmission procedure of a paging message according to the embodiment 4.

Processing of the B portion of FIG. 14 is performed, for example, when some eNBs of the eNBs 110 to 140 do not support the Paging Optimization. In this case, the MME 150 transmits the S1 paging message to all the eNBs as shown in the B portion of FIG. 14, and thereby no eNB fails to receive the paging message. Processing of the A portion of FIG. 14 may be performed when all the eNBs 110 to 140 support the Paging Optimization, or when the eNB that does not support the Paging Optimization can be identified.

Subsequently, referring to FIG. 15, configuration examples of the paging messages (the S1 paging message and the X2 paging message) when the Paging Optimization Indicator is added thereto according to the embodiment 4 of the present invention will be explained. In FIG. 15, an example is shown where ENUMERATED (yes, no . . . ) is set to the IE type and reference, which is the information element of the Paging Optimization indicator. When ENUMERATED (yes) is set, the Paging Optimization indicator indicates that the eNB supports the Paging Optimization, and when ENUMERATED (no) is set, the Paging Optimization Indicator indicates that the eNB does not support the Paging Optimization. In addition, ENUMERATED (yes, no may be set as ENUMERATED (true, false . . . ).

In addition, when the Paging Optimization Indicator is not present in the paging message, the eNB that has received the paging message does not transmit the paging message to the neighbouring eNBs through the X2 interface.

As explained above, the MME can appropriately set the eNB to which the MME transmits the S1 paging message by transmitting the S1 paging message together with the Paging Optimization Indicator. That is, the MME can transmit the S1 paging message only to the eNB that is made to perform Paging Optimization. Therefore, the eNB can be prevented from doubly receiving both the S1 paging message and the X2 paging message. Consequently, the eNB can be prevented from transmitting a paging signal to the mobile terminal in an overlapping manner based on the respective paging messages. Consequently, wasteful use of a radio resource can be prevented.

In addition, although the phrase Paging Optimization Indicator is used in the above-mentioned explanation, for example, a phrase "X2 Paging is approved or disapproved" may instead be used.

In addition, the embodiment 4 may be carried out in combination with the embodiment 3. This is similar to the case where the embodiments 1 and 2 are combined with each other to be carried out. That is, in a case where the MME does not understand whether or not the respective eNBs can carry out Paging Optimization, even though the MME transmits to the eNB the S1 paging message in which "yes" has been set to the information element of the Paging Optimization Indicator, the X2 paging message is not transmitted to the neighbouring eNBs when the eNB does not support the Paging Optimization. Therefore, the MME transmits to the eNB the S1 paging message in which "yes" has been set to the information element of the Paging Optimization Indicator after understanding that the eNB is the one that supports the Paging Optimization, and thereby the MME can make the paging message reach all the eNBs.

Embodiment 5

Next, a communication system that solves a problem described below will be explained in an embodiment 5. When all the eNBs under control of the MME 150 support Paging Optimization, the MME 150 cannot appropriately select the eNB that the MME 150 instructs to transmit the X2 paging message to the neighbouring eNBs instead, unless the MME 150 recognizes which eNB is adjacent to which eNB.

<Solution 1>

Figure 16A:
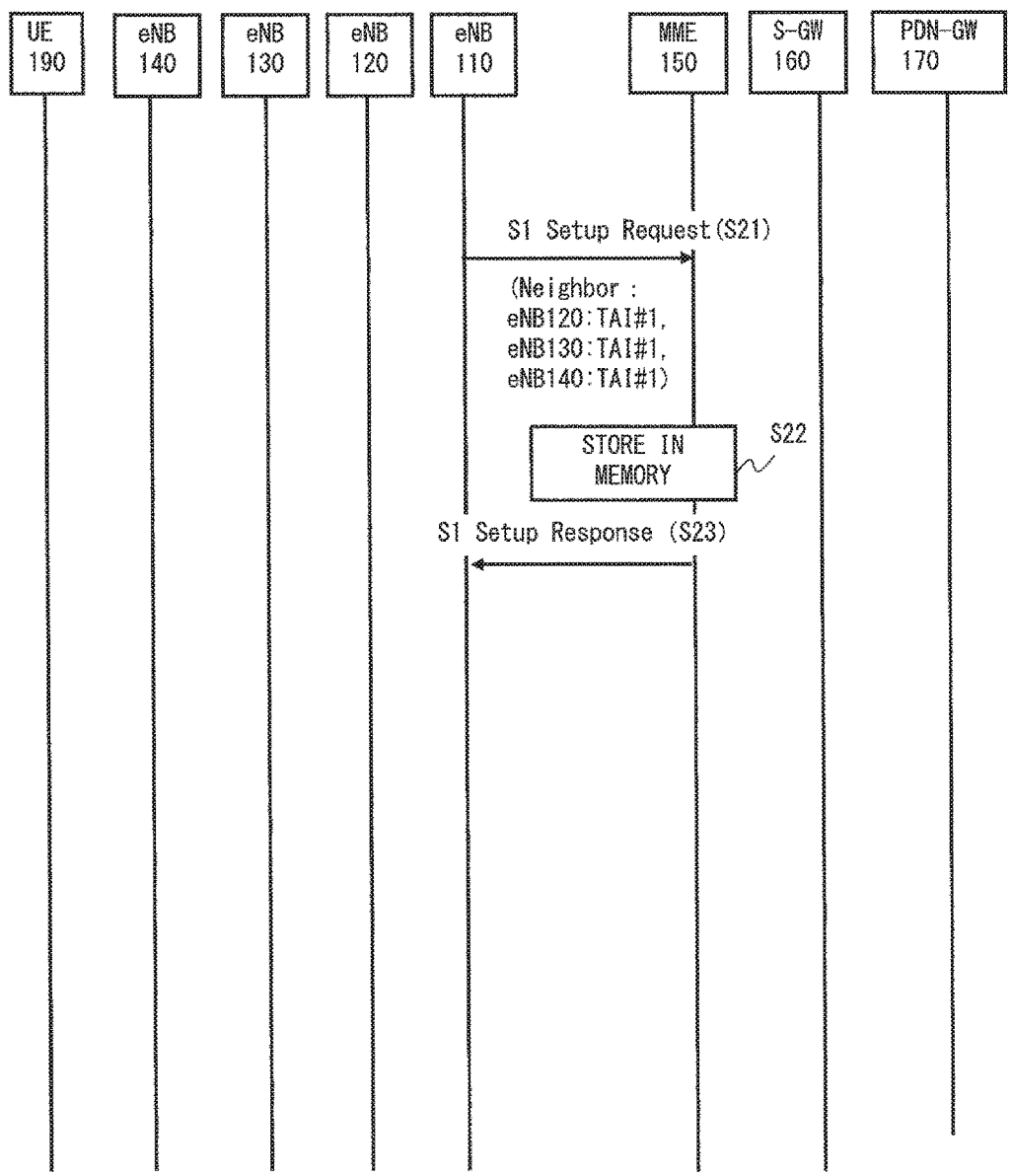
FIG. 16A is a chart showing a transmission procedure of an S1 Setup Request according to an embodiment 5.

In order to solve the above-mentioned problem, as shown in FIG. 16A, the eNB 110 notifies the MME 150 of a neighbouring eNB list of the eNB 110 together with setting information using an S1 Setup Request (S21). Information elements of a Global eNB ID and a TAI that identifies a TA to which the eNB belongs are included in the neighbouring eNB list.

Next, the MME 150 stores information on the eNB and the neighbouring eNB list transmitted from the eNB 110 (S22). Next, the MME 150 transmits an S1 Setup Response to the eNB 110 (S23). The MME 150 decides the eNB to which the MME 150 transmits the S1 paging message when an incoming call to the UE is generated based on the information on the eNB that has transmitted the stored neighbouring eNB list and the neighbouring eNB list. The MME 150, for example, may transmit the S1 paging message to the eNB having the largest number of neighbouring eNBs so that the paging message spreads early. Alternatively, the MME 150 may transmit the S1 paging message to the eNB where it is most probable that the UE will be located.

The eNB 110 that has received the S1 paging message from the MME 150 transmits the paging message to a mobile terminal of a cell area of the eNB 110, and also transmits the X2 paging message to the neighbouring eNBs.

Here, a configuration example of information elements of the S1 Setup Request is shown in FIG. 17. Neighbouring information, the Global eNB ID, and Supported TAs are added to the S1 Setup Request of FIG. 17.

Although the example where the neighbouring eNB list is transmitted using the S1 Setup Request has been explained in FIG. 16A, the neighbouring eNB list may instead be transmitted using an ENB CONFIGURATION UPDATE. A configuration example of information elements of the ENB CONFIGURATION UPDATE is shown in FIG. 18. Similar to FIG. 17, the Neighbour Information, the Global eNB ID, and the Supported TAs are added to the ENB CONFIGURATION UPDATE of FIG. 18.

<Solution 2>

Figure 16B:
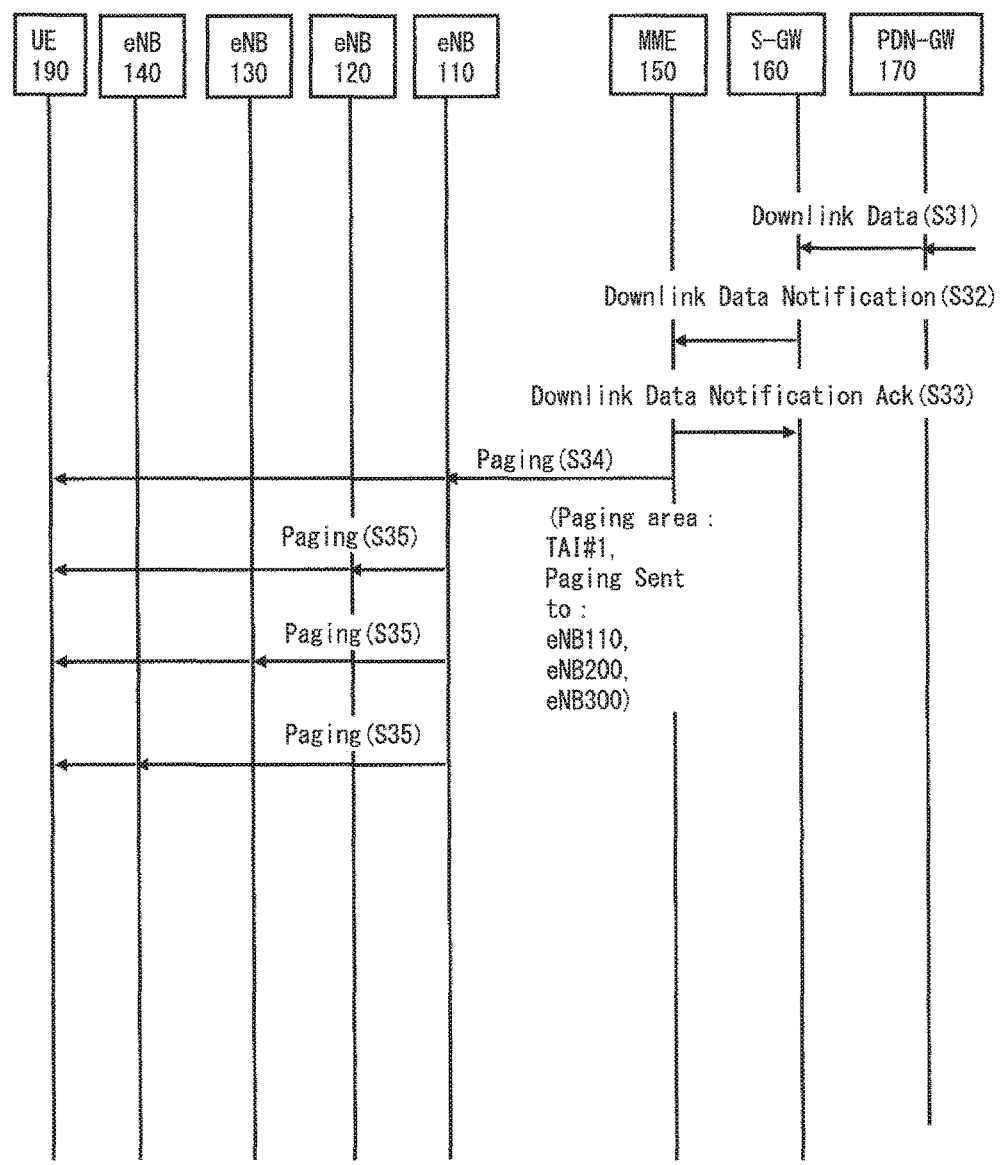
FIG. 16B is a chart showing a transmission procedure of a paging message according to the embodiment 5.

In order to solve the above-mentioned problem, a list of eNBs of transmission destinations is added to the S1 paging message transmitted by the MME 150 as shown in FIG. 16B. Here, a flow of processing described in FIG. 16B will be explained.

First, when Downlink data addressed to the UE 190 is generated in an idle state of the UE 190, the PDN-GW 170 connected to an external network receives the Downlink data, and transfers the Downlink data to the S-GW 160 (S31).

Next, when the S-GW 160 receives the Downlink data, it transmits to the MME 150 a Downlink Data Notification indicating the arrival of incoming data (S32). When the MME 150 receives the Downlink Data Notification, it transmits a Downlink Data Notification Ack to the S-GW 160 as a response signal (S33). Next, the MME 150 transmits an S1 paging message to the eNB 110 (S34). Here, an eNB list of the eNBs to which the MME 150 has transmitted the S1 paging message is included in the S1 paging message. The Global eNB ID and the TAI are included in the eNB list. In step S34 of FIG. 16B, TAI#1, the eNB 110 as a transmission destination eNB, an eNB 200 (not shown), and an eNB 210 (not shown) are shown.

When the eNB 1110 receives the S1 paging message, it transmits an X2 paging message to the neighbouring eNBs that belong to the TAI#1 shown in the S1 paging message but are not included in the transmission destination eNB list. If the eNBs 120 to 140 belong to the TAI#1, the eNB 110 transmits the X2 paging message to the eNBs 120 to 140. In the manner as described above, the eNB 110 can prevent transmitting of the X2 paging message to the eNBs that have already received the S1 paging message by receiving the transmission destination eNB list.

<Solution 3>

In order to solve the above-mentioned problem, processing of a combination of the solutions 1 and 2 may be executed. For example, as explained in FIG. 16A, the MME 150 decides the eNB to which the MME 150 transmits the S1 paging message based on the neighbouring eNB list. Furthermore, the MME 150 transmits the S1 paging message including the eNB list of the eNBs to which the MME 150 has transmitted the S1 paging message to the eNB 110 which it has been decided is the transmission destination of the S1 paging message.

As explained above, the eNB notifies the MME of the neighbouring eNB list by executing the processing described in the solutions 1 to 3, and thereby the MME can decide the appropriate eNB to which the MME transmits the S1 paging message. For example, the MME can decide the eNB so that the paging message spreads early. Furthermore, the MME notifies the eNB of the eNBs to which the MME has transmitted the S1 paging message, and thereby the eNB can prevent transmitting of the X2 paging message to the eNBs that have already received the S1 paging message. Consequently, transmission of a useless signal in a communication network can be prevented.

Embodiment 6

Figure 19:
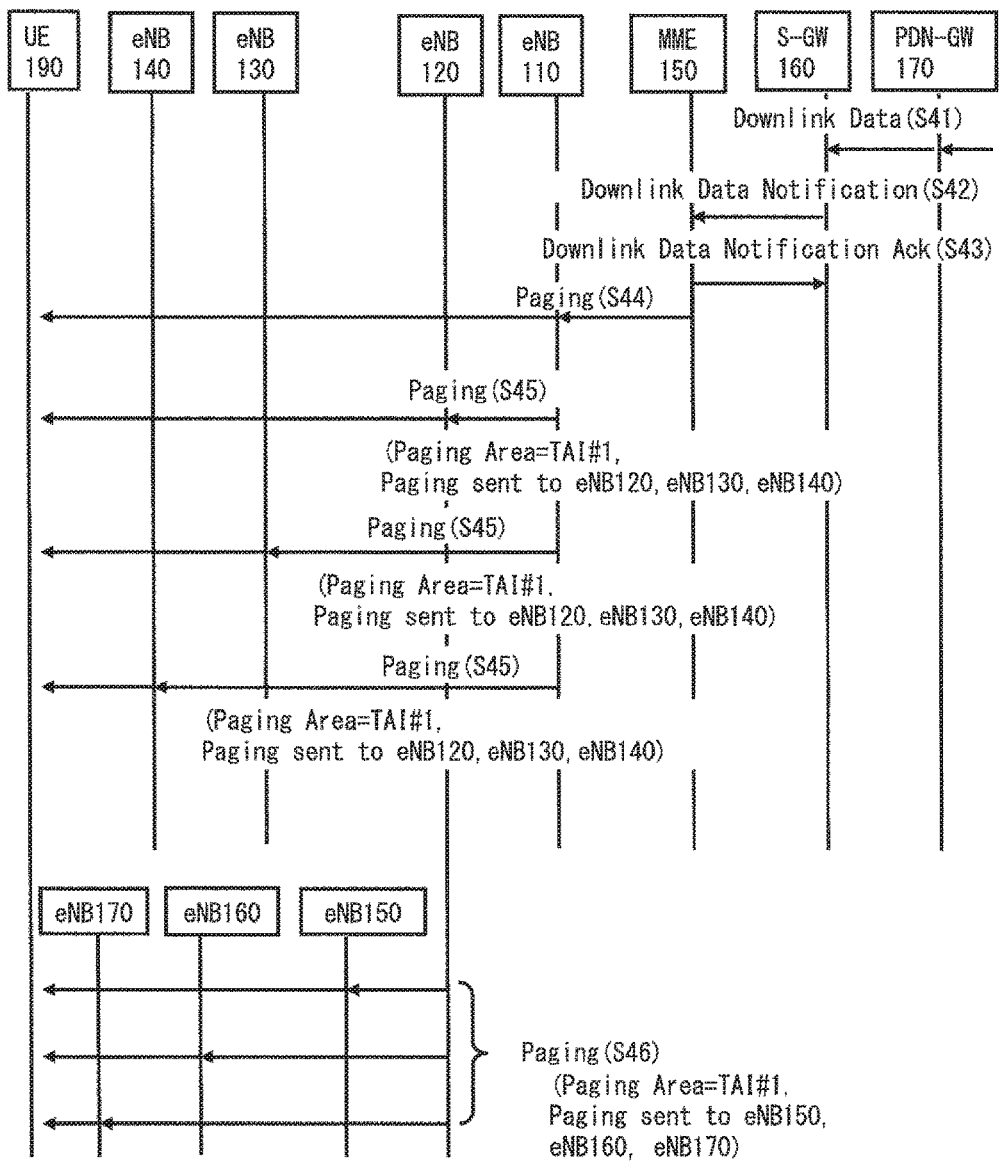
FIG. 19 is a chart showing a transmission procedure of a paging message according to an embodiment 6.

Next, a paging message transmission procedure according to an embodiment 6 of the present invention will be explained, referring to FIG. 19. The paging message transmission procedure according to the embodiment 6 aims at preventing overlapping reception of the X2 paging message in the eNBs.

Since steps S41 to S43 are similar to steps S31 to S33 of FIG. 16B, explanations thereof are omitted. In step S44, the MME 150 transmits the S1 paging message to the eNB 110. At this time, the MME 150 transmits the S1 paging message only to one eNB of the eNBs having the TAI serving as a transmission object of the paging message. That is, the MME 150 transmits the S1 paging message only to one eNB of the eNBs belonging to the same TA. In an example of FIG. 19, when the eNBs 110 to 170 are present as the eNBs having the TAI#1, the MME 150 transmits the S1 paging message only to the eNB 110. In addition, the eNB 110 that has received the S1 paging message transmits the paging message to a mobile terminal located in a cell area formed by the eNB 110.

Next, the eNB 110 transmits the X2 paging message to the neighbouring eNBs 120 to 140 connected through the X2 interface among the eNBs 120 to 170, which are the TAI#1 (S45). At this time, the eNB 110 transmits transmission destination information of the X2 paging message, so as to include it in the X2 paging message. For example, in the example of FIG. 19, the eNB 110 notifies each of the eNBs 120 to 140 of the eNBs 120 to 140 as the transmission destination information of the X2 paging message. The eNBs 120 to 140 that have received the X2 paging message transmit the paging message to mobile terminals located in cell areas formed by the respective eNBs.

Next, the eNB 120 that has received the X2 paging message further transmits the X2 paging message to the neighbouring eNBs 150 to 170 connected through the X2 interface (S46). The eNBs 150 to 170 that have received the X2 paging message transmit the paging message to mobile terminals located in cell areas formed by the respective eNBs. Furthermore, similarly to step S45, the eNB 120 notifies each of the eNBs 150 to 170 of the eNBs 150 to 170 as the transmission destination information of the X2 paging message.

Next, a configuration example of information elements of a paging message (for example, an X2 paging message) is shown in FIG. 20. An information element of List of eNBs is added to the paging message of FIG. 20, and information on an eNB of a transmission destination is set to the List of eNBs.

As explained above, the eNB also notifies about the transmission destination information of the X2 paging message when it transmits the X2 paging message. Consequently, the eNB that has received the X2 paging message can exclude the eNBs that have already received the X2 paging message from transmission objects of the X2 paging message, when it further transmits the X2 paging message to the neighbouring eNBs. Consequently, the eNB can avoid receiving the X2 paging message in an overlapping manner.

For example, a case will be explained where the eNB 120 is connected to the eNB 110 and the eNBs 130 to 170 through the X2 interface in the example of FIG. 19. In this case, when the eNB 120 is notified by the eNB 110 that the eNB 110 has transmitted the X2 paging message to the eNBs 120 to 140, the eNB 120 can exclude the eNBs 130 and 140 from the transmission objects of the X2 paging message. Consequently, the eNBs 130 and 140 can avoid receiving the X2 paging message in an overlapping manner.

Embodiment 7

Figure 21:
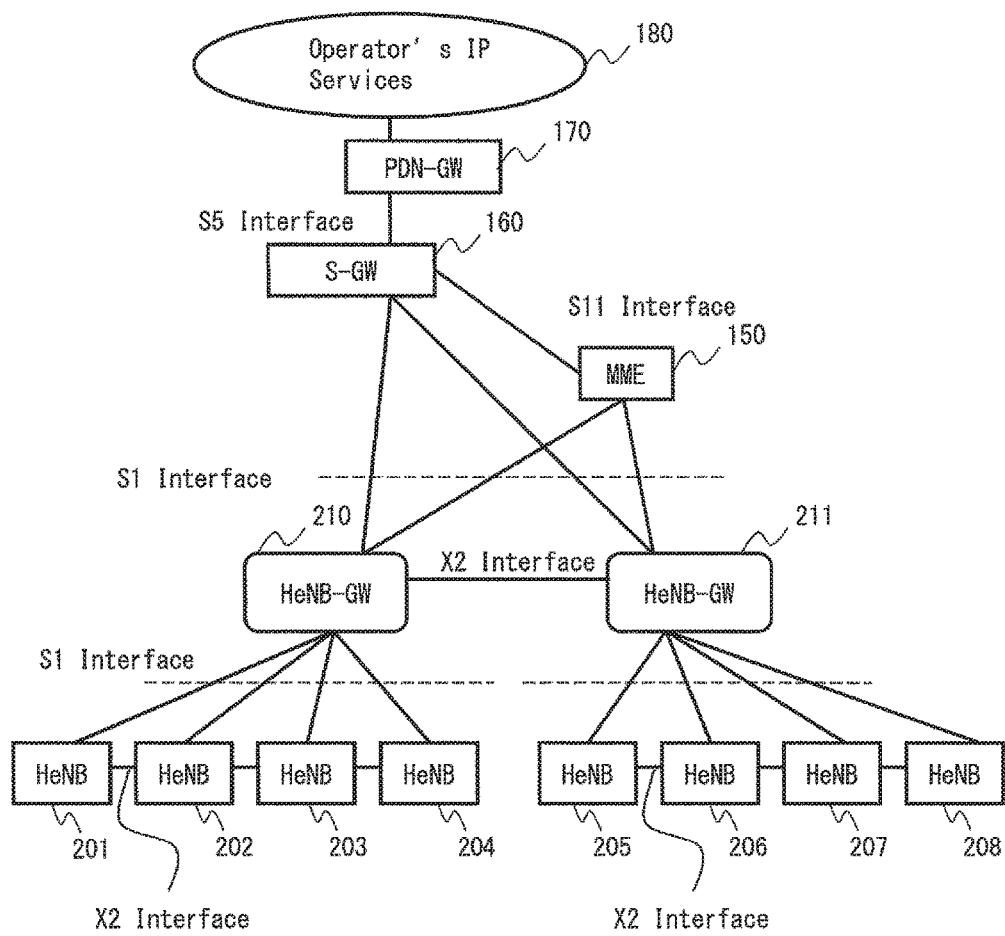
FIG. 21 is a configuration diagram of a communication system according to an embodiment 7.

Next, a configuration example of a communication system according to an embodiment 7 of the present invention will be explained, referring to FIG. 21. In the communication system of FIG. 21, the eNBs 110 to 140 in the communication system of FIG. 8 are replaced with HeNBs (Home eNode Bs) 201 to 208, further, an HeNB-GW (HeNB-Gateway) 210 is arranged in order to aggregate the HeNBs 201 to 204, and an HeNB-GW 211 is arranged in order to aggregate the HeNBs 205 to 208. The other configurations of FIG. 21 are similar to those of FIG. 8. The HeNB is installed in a home etc. in the LTE architecture, and is used as a base station that covers a narrow range.

Interfaces between the HeNB-GW 210 and the S-GW 160 and between the HeNB-GW 210 and the MME 150 are specified as the S1 interface. Interfaces between the HeNB-GW 211 and the S-GW 160 and between the HeNB-GW 211 and the MME 150 are also similarly specified as the S1 interface. Furthermore, an interface between the HeNB-GW and the HeNB is also specified as the S1 interface. Interfaces between the HeNB-GWs and between the HeNBs are specified as the X2 interface.

In addition, although in FIG. 21, the HeNB-GWs 210 and 211 are arranged in order to aggregate the HeNBs 201 to 208, the HeNB-GWs 210 and 211 may not be arranged. The communication system in that case is the communication system in which the eNBs 110 to 140 in the communication system of FIG. 8 have been replaced with the HeNBs 201 to 208.

Figure 22:
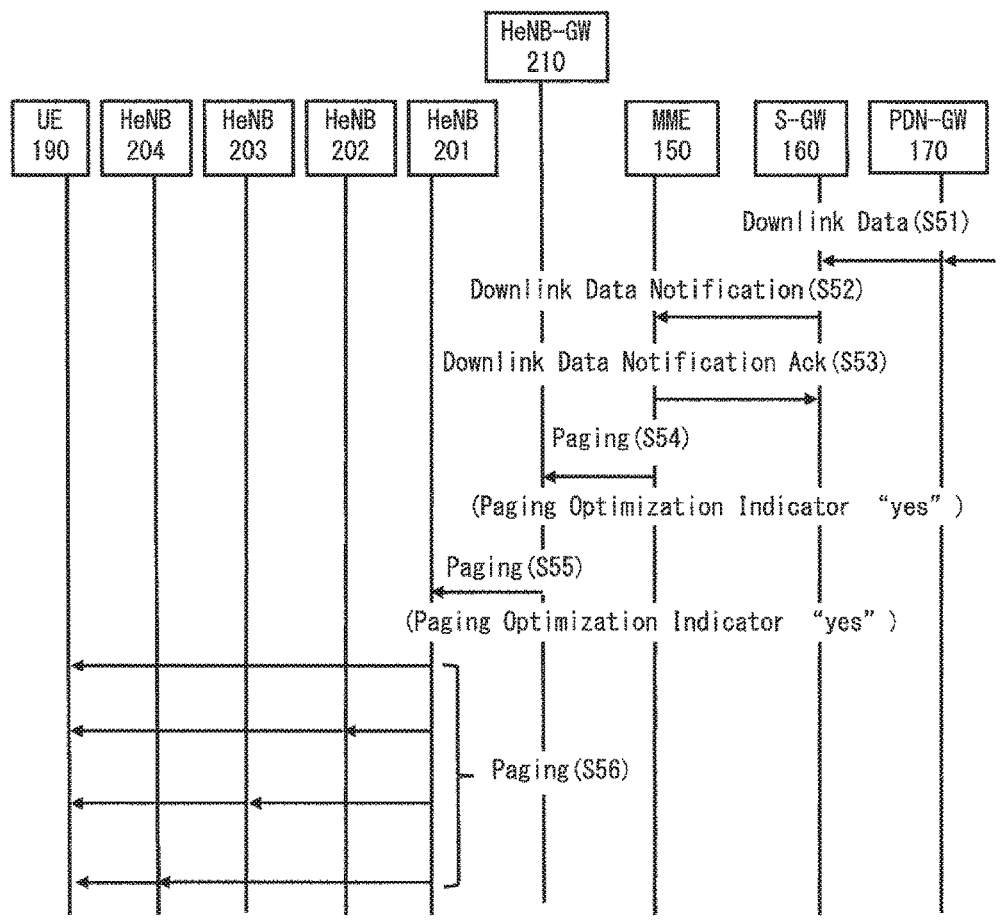
FIG. 22 is a chart showing a procedure for transmitting a paging message according to the embodiment 7.

Next, FIG. 22 shows a flow of paging message transmission processing in the communication system of FIG. 21. Since steps S51 to S53 are similar to steps S11 to S13 of FIG. 14, detailed explanations thereof are omitted. Furthermore, since steps S54 and S55 are similar to step S14 of FIG. 14, and step S56 is similar to step S15 of FIG. 14, detailed explanations thereof are omitted.

Here, when the HeNB-GW 210 receives the S1 paging message in step S54, it may transmit the X2 paging message to another HeNB-GW (for example, the HeNB-GW 211) instead of the MME 150.

As explained above, Paging Optimization can be made to operate also in the communication system having the HeNBs.

Embodiment 8

Next, a configuration example of a communication system according to an embodiment 8 of the present invention will be explained using FIG. 23. The communication system of FIG. 23 has HNBs (Home Node Bs) 301 to 308, an HNB-GW (HNB-Gateway) 310, an HNB-GW 311, and a CN (Core Network) 320. The CN 320 includes network devices specified in 3GPP, such as an SGSN (Serving General packet radio service Support Node), a GGSN (Gateway General packet radio service Support Node), and an MSC (Mobile Switching Center). The HNB is installed in a home etc. and is used as a base station that covers a narrow range in a network specified by 3GPP. The HNB is, for example referred to as a femto base station.

An interface between the HNB-GW and the CN is specified as an Iu interface. An interface between the HNB-GWs is specified as an Iurh interface. An interface between the HNB and the HNB-GW is specified as an Iuh interface. An interface between the HNBs is specified as the Iurh interface.

Figure 23:
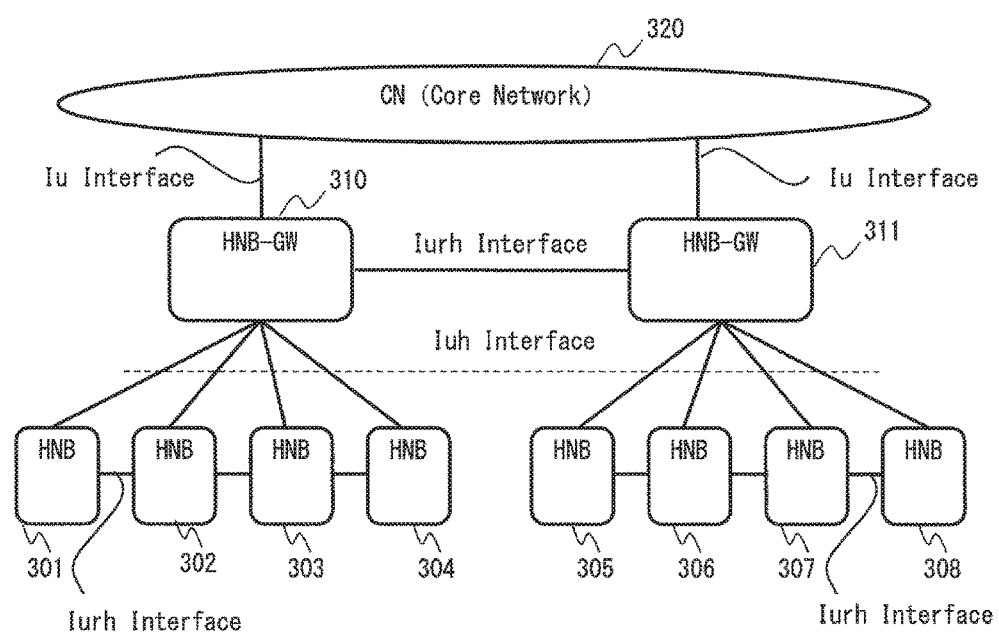
FIG. 23 is a configuration diagram of a communication system according to an embodiment 8.

In the communication network of FIG. 23, unlike the communication network of FIG. 21, a message corresponding to the S1 Setup Request is not present as the message transmitted from the HNB-GW 310 or the HNB-GW 311 to the CN 320. Therefore, it is set to the CN 320 by an operator whether or not the HNBs 301 to 308 and the HNB-GWs 310 to 311 support Paging Optimization.

Figure 24:
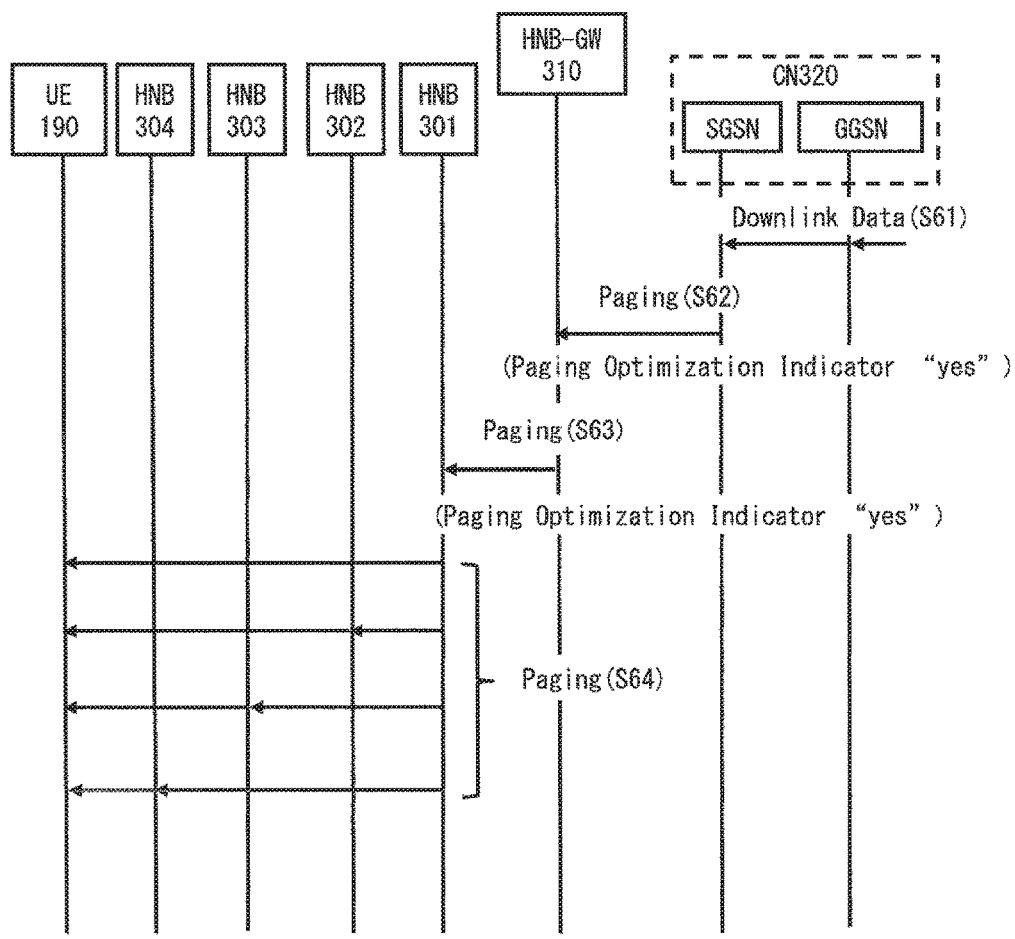
FIG. 24 is a chart showing a procedure for transmitting a paging message according to the embodiment 8.

Next, FIG. 24 shows a flow of paging message transmission processing in the communication system of FIG. 23. Since step S61 corresponds to step S51 of FIG. 22, and steps S62 to S64 correspond to steps S54 to S56 of FIG. 22, detailed explanations thereof are omitted.

Here, in the communication system of FIG. 23, it is set to the CN 320 by manual operation of the operator whether or not the HNB and the HNB-GW support the Paging Optimization. However, when the number of HNBs increases, there is a case where it cannot be set to the CN 320 whether or not all the HNBs support the Paging Optimization. In such a case, a Paging Optimization Indicator is not included in a paging message (hereinafter, an Iu paging message) transmitted from the CN 320 to the HNB-GWs 310 and 311.

Meanwhile, in registration processing from the HNB to the HNB-GW executed at the time of startup of the HNB, the HNB can register with the HNB-GW using an HNB Registration message whether or not the HNB supports the Paging Optimization. In such a case, even if the Paging Optimization Indicator is not set to the Iu paging message transmitted from the CN 320, the HNB-GW 310 or 311 can set the Paging Optimization indicator to transmit a paging message (hereinafter, the Iuh paging message) to the HNB.

Embodiment 9

Figure 25:
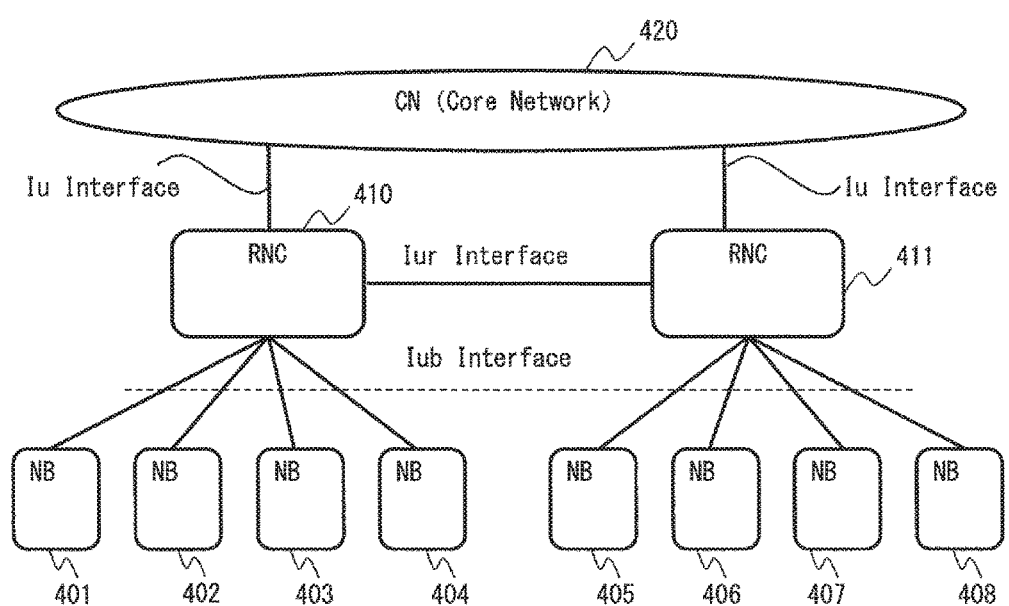
FIG. 25 is a configuration diagram of a communication system according to an embodiment 9.

Next, a configuration example of a communication system according to an embodiment 9 of the present invention will be explained, referring to FIG. 25. The communication system of FIG. 25 has NBs (Node Bs) 401 to 408, an RNC (Radio Network Controller) 410, an RNC 411, and a CN 420. The CN 420 includes network devices specified in 3GPP, such as an SGSN, a GGSN, and an MSC, similarly to the CN 320.

Figure 26:
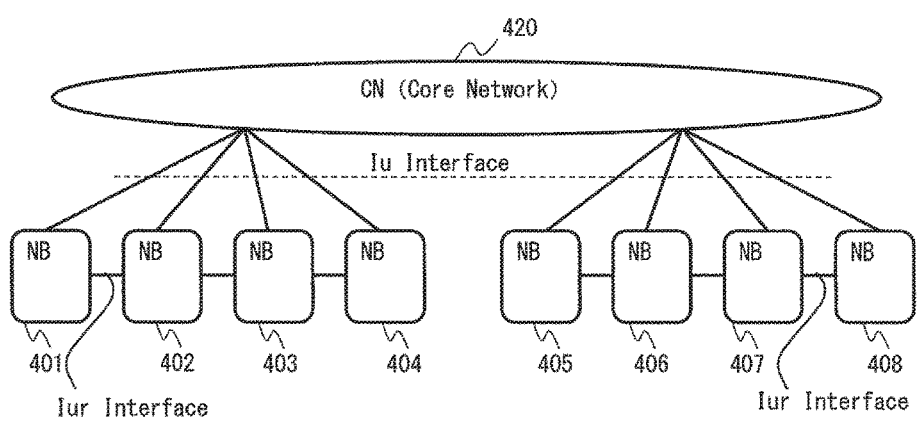
FIG. 26 is a configuration diagram of the communication system according to the embodiment 9.

An interface between the RNC and the CN is specified as the Iu interface. An interface between the RNCs is specified as an Iur interface. An interface between the RNC and the NB is specified as an Iub interface. Since paging message transmission processing in the communication system of FIG. 25 is similar to the paging message transmission processing in FIG. 24, a detailed explanation thereof is omitted. In addition, although the communication system in which the RNCs 410 and 411 are arranged between the NBs 401 to 408 and the CN 420 has been explained in FIG. 25, the RNC may be omitted as shown in FIG. 26. In this case, an interface between the NB and the CN is specified as the Iu interface. Furthermore, an interface between the NBs is specified as the Iur interface. Also in such a case, the paging message transmission processing in FIG. 24 can be applied.

Embodiment 10

Figure 27:
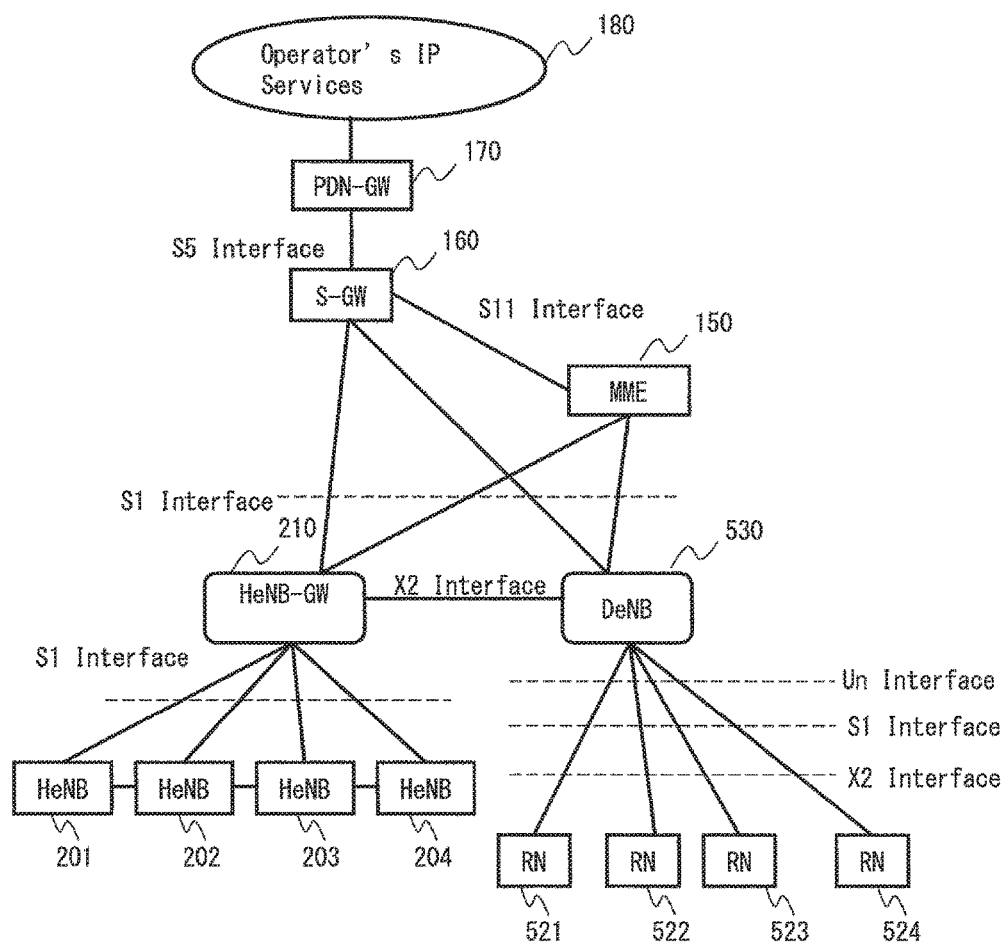
FIG. 27 is a configuration diagram of a communication system according to an embodiment 10.
Figure 28:
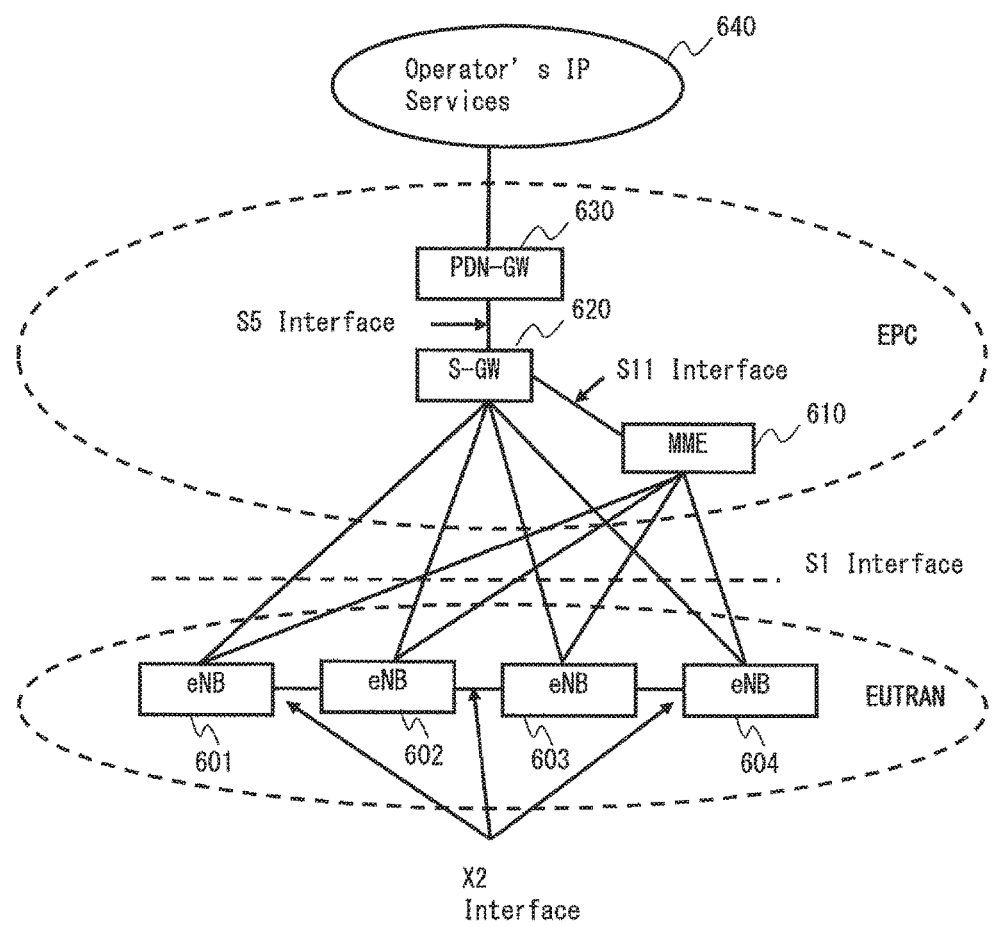
FIG. 28 is a configuration diagram of a general communication system in LTE.
Figure 29:
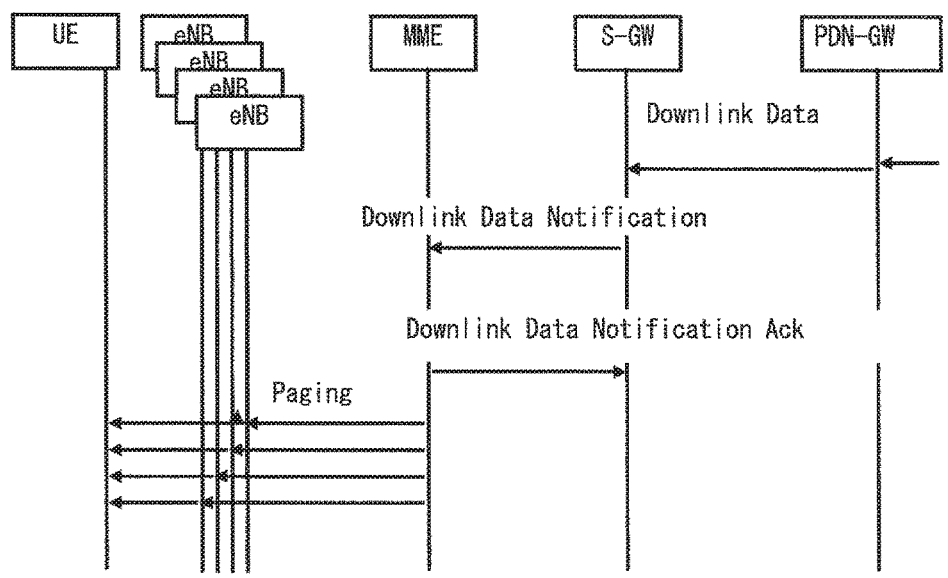
FIG. 29 is a chart showing a general procedure for transmitting a paging message.
Figure 30:
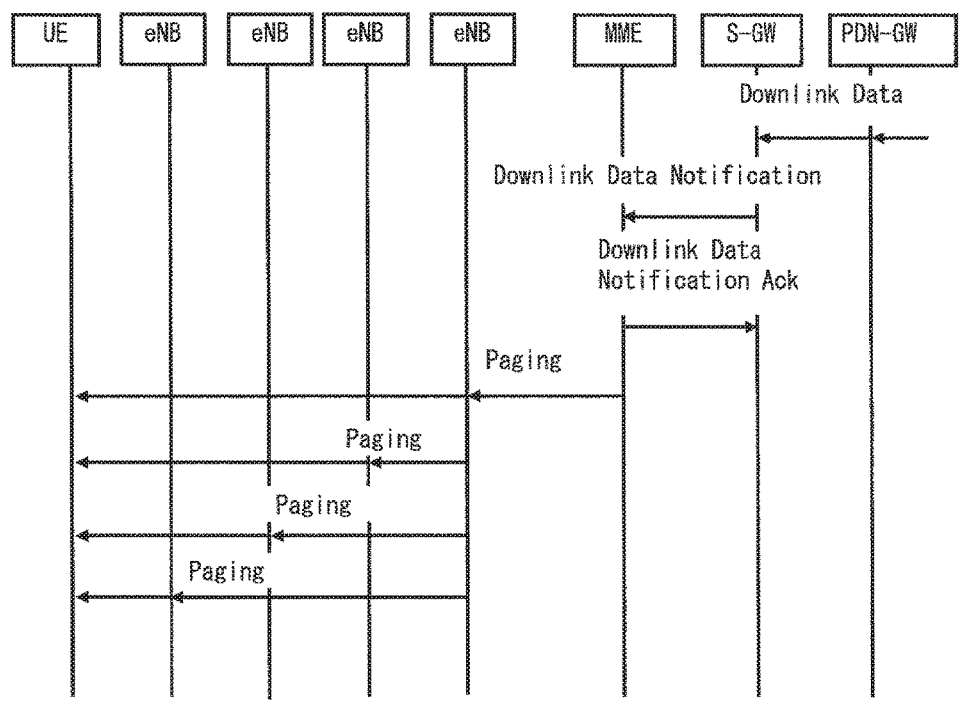
FIG. 30 is a chart showing a general procedure for transmitting the paging message.
Figure 31:
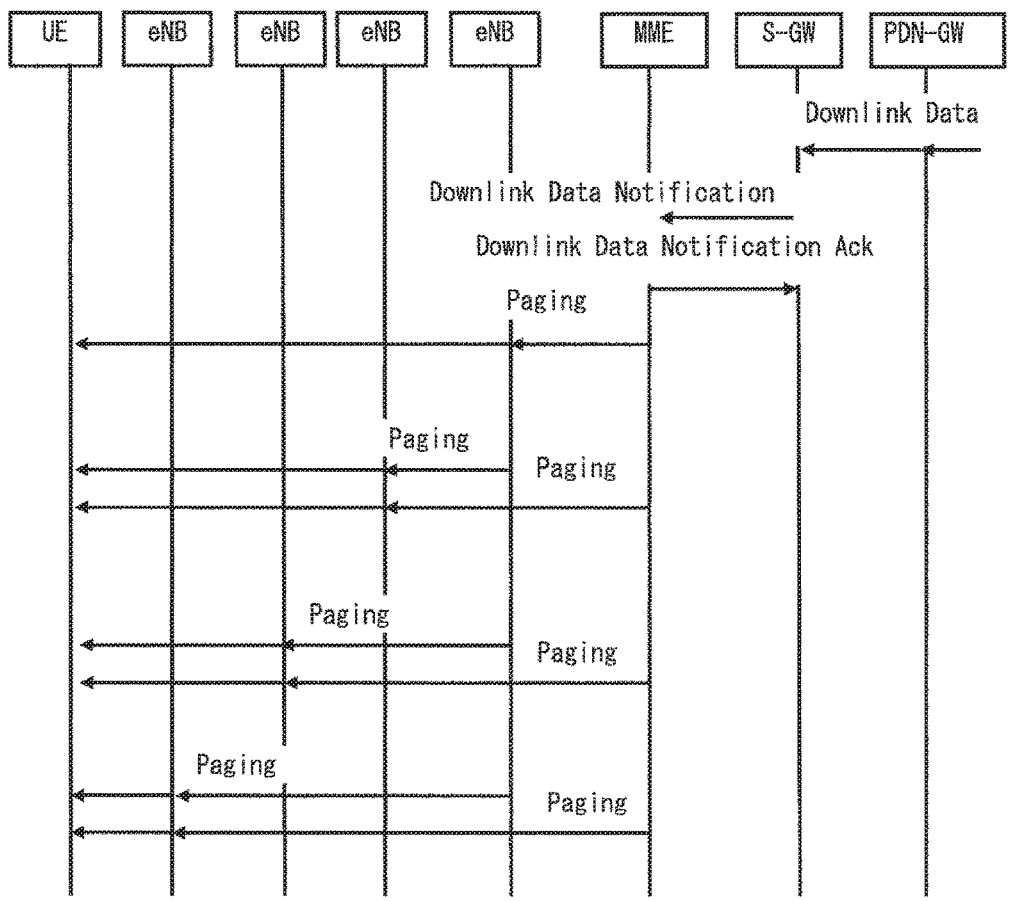
FIG. 31 is a chart showing a general procedure for transmitting the paging message.
Figure 32:
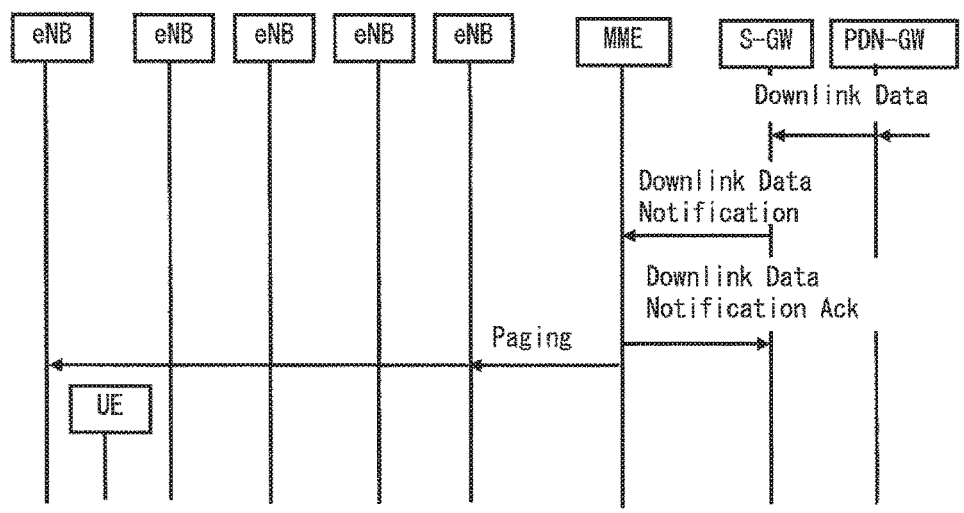
FIG. 32 is a chart showing a general procedure for transmitting the paging message.

Next, a configuration example of a communication system according to an embodiment 10 of the present invention will be explained using FIG. 27. The communication system of FIG. 27 has a configuration in which the HeNBs 205 to 208 and the HeNB-GW 211 in the communication system of FIG. 21 are replaced with RNs (Relay Nodes) 521 to 524 and a DeNB (Donor eNB) 530. The RN is a device that is connected to an eNB using wireless communication in order to expand a coverage of the eNB, and relays communication between UE and the eNB. The DeNB is the eNB to which the RN is connected. Although an interface between the RN and the DeNB is specified as a Un interface, the RN supports the S1 interface and the X2 interface like the eNB. However, the X2 interface is not supported between the RNs. The X2 interface in the RN is used for communication with the DeNB.

Here, when the S1 paging message transmitted from the MME 150 is transferred to the RN 521, it is considered that the RN 521 transmits the X2 paging message to the DeNB 530 through the X2 interface, and that the DeNB 530 transmits the X2 paging message to the RNs 522 to 524. However, the RN transmitting the X2 paging message to the neighbour RNs via the DeNB as described above only uses a radio resource between the DeNB 530 and the RN, resulting in no advantage.

Accordingly, when the DeNB 530 receives from the MME 150 an S1 paging message in which "yes" or "true" has been set to an information element of the Paging Optimization Indicator, the DeNB 530 sets "no" or "false" to the information element of the Paging Optimization indicator, and transmits the paging message to the RNs 521 to 524. Alternatively, the DeNB 530 transmits the paging message to the RNs 521 to 524 without setting the information element of the Paging Optimization indicator.

In the communication system having the RN, wasteful use of the radio resource between the DeNB 530 and the RN can be prevented by setting the information element of the Paging Optimization Indicator as mentioned above.

Other Embodiment

In the above-mentioned embodiments, the eNB, the HeNB, the HeNB-GW, and the RN, which are RAN (Radio Access Network) nodes, transmit the Paging Optimization Indicator to the MME or the host node, and notify the MME or the host node of whether or not they support the Paging Optimization. In contrast with this, in order to understand whether or not a device under control of the MME or the host node supports the Paging Optimization in the MME or the host node, the MME or the host node may understand a support situation of the Paging Optimization of the RAN node by an operator's setting, i.e., O&M (or OAM: Operation and Maintenance) setting.

Note that the present invention is not limited to the above-described embodiments, and that they can be appropriately changed without departing from the spirit of the invention.

In the above-mentioned explanation of the present invention, the present invention is described in detail in relation to the system related to 3GPP (Third Generation Partnership Project) in order that those skilled in the art can more readily understand the invention. However, a principle of the paging processing can be applied to other systems, such as other CDMA, WIMAX, or a wireless system.

Note that the above-described embodiments are configured such that the base station notifies the host node of its own capability information. However, it is also possible to achieve the present invention by other methods. Specifically, the present invention may be configured such that a node having an O&M function that manages the base station collects capability information from the base station, and informs the MME of the capability information.

Furthermore, although the present invention has been explained as a hardware configuration in the above-mentioned embodiments, it is not limited to this, and it is also possible to achieve processing in the base station or the host node by making a CPU (Central Processing Unit) execute a computer program. In this case, the computer program is stored using various types of non-transitory computer readable media, and can be supplied to a computer. The non-transitory computer readable media include various types of tangible storage media. Examples of the non-transitory computer readable medium include: a magnetic recording medium (for example, a flexible disk, a magnetic tape, a hard disk drive); a magnetic optical recording medium (for example, a magnetic optical disk); a CD-ROM (Read Only Memory); a CD-R; a CD-R/W; and a semiconductor memory (for example, a mask ROM, a PROM (Programmable ROM), an EPROM (Erasable PROM), a flash ROM, an RAM (random access memory)). In addition, the program may be supplied to the computer by various types of transitory computer readable media. Examples of the transitory computer readable medium include an electrical signal, an optical signal, and an electromagnetic wave. The transitory computer readable medium can supply the program to the computer through a wired communication channel, such as an electric wire and an optical fiber, or a wireless communication channel.

Hereinbefore, although the invention in the present application has been explained with reference to the embodiments, the invention in the present application is not limited by the above. Various changes that can be understood by those skilled in the art within the scope of the invention can be made to a configuration and a detail of the invention in the present application.

This application claims priority based on Japanese Patent Application No. 2012-182235 filed on Aug. 21, 2012, and the entire disclosure thereof is incorporated herein.

REFERENCE SIGNS LIST 10 base station
11 control unit
12 communication unit
13 host node interface
14 base station interface
20 host node
21 control unit
22 communication unit
40 base station
50 mobile terminal
51 control unit
52 communication unit
53 antenna
110 to 140 eNB
111 MME interface
112 controller
113 memory
114 base station interface
115 communication unit
121 MME interface
122 controller
123 memory
124 base station interface
125 communication unit
150 MME 151 eNB interface
152 controller
153 memory
160 S-GW
170 PDN-GW
180 IP Service
190 UE
301 to 308 HNB
310, 31 HNB-GW
320 CN
401 to 408 NB
410, 41 RNC
420 CN
521 to 524 RN
530 DeNB

The invention claimed is:

1. A communication system comprising:
a base station transmits to a host node a first message which includes base station list information for paging and first information which identifies whether the base station can send a X2 paging message to another base station or not and a SETUP REQUEST message which includes second information related to neighbor base stations, and
the host node transmits, to the base station, a paging message and an instruction related to a X2 paging message,
wherein the base station transmits the X2 paging message to another base station based on the instruction.

2. The communication system according to claim 1,
wherein the paging message is transmitted from the host node based on the base station list information, and
wherein the base station list information is a list of neighbor base stations to which the host node transmits the paging message.

3. The communication system according to claim 1,
wherein the second information includes ID information which indicates ID of one of the neighbor base stations.

4. The communication system according to claim 1,
wherein the second information includes information related to Supported tracking areas (TAs).

5. A method comprising:
transmitting to a host node a first message which includes base station list information for paging and first information which identifies whether the base station can send a X2 paging message to another base station or not and a SETUP REQUEST message which includes second information related to neighbor base stations,
receiving a paging message and an instruction related to a X2 paging message from the host node, and
transmitting the X2 paging message to another base station based on the instruction.

6. The method according to claim 5,
wherein the paging message is transmitted from the host node based on the base station list information, and
wherein the base station list information is a list of neighbor base stations to which the host node transmits the paging message.

7. The method according to claim 5,
wherein the second information includes ID information which indicates ID of one of the neighbor base stations.

8. The method according to claim 5,
wherein the second information includes information related to Supported tracking areas (TAs).

9. A method comprising:
receiving from a base station a first message which includes base station list information for paging and first information which identifies whether the base station can send a X2 paging message to another base station or not and a SETUP REQUEST message which includes second information related to neighbor base stations, and
transmitting, to the base station, a paging message and an instruction related to a X2 paging message,
wherein the X2 paging message is transmitted from the base station to another base station based on the instruction.

10. The method according to claim 9,
wherein the paging message is transmitted from the host node based on the base station list information, and
wherein the base station list information is a list of neighbor base stations to which the host node transmits the paging message.

11. The method according to claim 9,
wherein the second information includes ID information which indicates ID of one of the neighbor base stations.

12. The method according to claim 9,
wherein the second information includes information related to Supported tracking areas (TAs).

* * * * *